United States Patent
Sato et al.

(10) Patent No.: US 10,660,171 B2
(45) Date of Patent: *May 19, 2020

(54) DISCHARGE LAMP DRIVE DEVICE, LIGHT SOURCE DEVICE, PROJECTOR, AND DISCHARGE LAMP DRIVE METHOD

(71) Applicant: SEIKO EPSON CORPORATION, Tokyo (JP)

(72) Inventors: Shun Sato, Matsumoto (JP); Junichi Suzuki, Matsumoto (JP); Masaru Kono, Shimoina-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,748

(22) Filed: Sep. 28, 2018

(65) Prior Publication Data

US 2019/0104602 A1    Apr. 4, 2019

(30) Foreign Application Priority Data

Sep. 29, 2017   (JP) ................................. 2017-190276

(51) Int. Cl.
*H05B 41/39*        (2006.01)
*H05B 41/392*       (2006.01)
(Continued)

(52) U.S. Cl.
CPC ..... *H05B 41/3928* (2013.01); *G03B 21/2026* (2013.01); *G03B 21/2053* (2013.01);
(Continued)

(58) Field of Classification Search
CPC ........................ G03B 21/2026; G03B 21/2053; G03B 35/16; H05B 41/2928; H05B 37/029;
(Continued)

(56) References Cited

U.S. PATENT DOCUMENTS 6,160,361 A * 12/2000 Giannopoulos ........ H05B 41/36
   315/307
6,813,525 B2 * 11/2004 Reid .................... G06Q 10/087
   700/19

(Continued)

FOREIGN PATENT DOCUMENTS

FR        2926183 A1     7/2009
JP      2008-304588 A   12/2008
(Continued)

OTHER PUBLICATIONS

Feb. 11, 2019 Search Report issued in European Patent Application No. 18197518.6.

(Continued)

*Primary Examiner* — Bao-Luan Q Le
(74) *Attorney, Agent, or Firm* — Oliff PLC

(57) ABSTRACT

A discharge lamp drive device includes a discharge lamp driver adapted to supply a drive current to a discharge lamp having a first electrode and a second electrode, a control section adapted to control the discharge lamp driver, and a storage section adapted to store a plurality of drive patterns of the drive current. The control section is configured to select one drive pattern of the plurality of drive patterns based on machine learning, and execute the selected drive pattern. In a case in which a predetermined condition is fulfilled, the control section executes a predetermined drive pattern of the plurality of drive patterns without selecting and executing the drive pattern based on the machine learning.

20 Claims, 16 Drawing Sheets

(51) Int. Cl.
*G03B 21/20* (2006.01)
*H05B 41/292* (2006.01)
*H05B 41/16* (2006.01)
*H05B 41/288* (2006.01)

(52) U.S. Cl.
CPC ......... *H05B 41/16* (2013.01); *H05B 41/2887* (2013.01); *H05B 41/2928* (2013.01); *H05B 41/3921* (2013.01)

(58) Field of Classification Search
CPC ............ H05B 41/2883; H05B 41/2887; H05B 41/2921; H05B 41/16; H05B 41/3921; H05B 41/2888; H05B 41/38; H05B 41/2923; H05B 41/2925; H05B 41/2828; H05B 41/24; H05B 41/36; H05B 41/3928; Y02B 20/208; Y02B 20/202; G02B 27/2228; H04N 9/3155
See application file for complete search history.

(56) References Cited

U.S. PATENT DOCUMENTS

| | | | |
|---|---|---|---|
| 8,044,334 B2 | 10/2011 | Kagata et al. | |
| 8,120,265 B2 * | 2/2012 | Van Casteren | G01R 19/0092 |
| | | | 315/209 R |
| 8,120,285 B2 * | 2/2012 | Terashima | H05B 41/2887 |
| | | | 315/246 |
| 8,907,570 B2 * | 12/2014 | Kwag | H05B 37/029 |
| | | | 315/130 |
| 9,538,627 B2 | 1/2017 | Suzuki | |
| 9,599,885 B2 * | 3/2017 | Narikawa | G03B 21/2053 |
| 9,730,304 B2 * | 8/2017 | Saka | H05B 41/24 |
| 9,785,041 B2 * | 10/2017 | Sato | G03B 21/2053 |
| 10,375,808 B2 | 8/2019 | Suzuki et al. | |
| 2002/0010518 A1 * | 1/2002 | Reid | G06Q 10/087 |
| | | | 700/31 |
| 2009/0237009 A1 * | 9/2009 | Okawa | H05B 41/2928 |
| | | | 315/307 |
| 2009/0237624 A1 | 9/2009 | Soma et al. | |
| 2010/0128232 A1 | 5/2010 | Kagata et al. | |
| 2010/0134033 A1 * | 6/2010 | Terashima | H05B 41/2887 |
| | | | 315/246 |
| 2010/0201281 A1 | 8/2010 | Terashima et al. | |
| 2010/0315015 A1 * | 12/2010 | Van Casteren | G01R 19/0092 |
| | | | 315/224 |
| 2011/0221348 A1 * | 9/2011 | Kwag | H05B 37/0272 |
| | | | 315/130 |
| 2012/0074858 A1 * | 3/2012 | Ono | H05B 41/2883 |
| | | | 315/209 R |
| 2012/0162611 A1 * | 6/2012 | Terashima | G03B 21/2053 |
| | | | 353/30 |
| 2014/0218697 A1 | 8/2014 | Suzuki | |
| 2015/0268544 A1 * | 9/2015 | Narikawa | G03B 21/2053 |
| | | | 353/85 |
| 2016/0320693 A1 * | 11/2016 | Sato | G03B 21/2053 |
| 2017/0142816 A1 * | 5/2017 | Saka | H05B 41/24 |
| 2017/0155880 A1 | 6/2017 | Nagata et al. | |
| 2017/0219919 A1 * | 8/2017 | Kito | H05B 41/2887 |

FOREIGN PATENT DOCUMENTS

| | | |
|---|---|---|
| JP | 2009-169304 A | 7/2009 |
| JP | 2011-103310 A | 5/2011 |
| JP | 4692611 B2 | 6/2011 |
| JP | 2016-018746 A | 2/2016 |
| JP | 2016-213011 A | 12/2016 |
| JP | 6136323 B2 | 5/2017 |

OTHER PUBLICATIONS

Nov. 28, 2018 Extended European Search Report issued in European Patent Application No. 18195767.1.
U.S. Appl. No. 16/135,147, filed Sep. 19, 2018 in the name of Kono et al.

\* cited by examiner

DISCHARGE LAMP DRIVE DEVICE, LIGHT SOURCE DEVICE, PROJECTOR, AND DISCHARGE LAMP DRIVE METHOD

BACKGROUND

1. Technical Field

The present invention relates to a discharge lamp drive device, a light source device, a projector, and a discharge lamp drive method.

2. Related Art

As shown in, for example, JP-A-2016-018746, there has been known a discharge lamp lighting device for changing a pulse of an AC current supplied to a discharge lamp in accordance with a value of an applied voltage applied to the discharge lamp.

However, there are individual differences between discharge lamps, and the change in the applied voltage (inter-electrode voltage) applied to the discharge lamp differs depending on the individual discharge lamp. Therefore, by depending on a drive method which is not capable of considering the individual differences between discharge lamps, the life of the discharge lamp cannot sufficiently be extended in some cases.

SUMMARY

An advantage of some aspects of the invention is to provide a discharge lamp drive device capable of extending the life of the discharge lamp irrespective of the individual differences between discharge lamps, a light source device equipped with such a discharge lamp drive device, and a projector equipped with such a light source device. Another advantage of some aspects of the invention is to provide a discharge lamp drive method capable of extending the life of the discharge lamp irrespective of the individual difference between discharge lamps.

A discharge lamp drive device according to an aspect of the invention includes a discharge lamp driver adapted to supply a drive current to a discharge lamp having a first electrode and a second electrode, a control section adapted to control the discharge lamp driver, and a storage section adapted to store a plurality of drive patterns of the drive current, the control section is configured to select one drive pattern of the plurality of drive patterns based on machine learning, and execute the selected drive pattern, and in a case in which a predetermined condition is fulfilled, the control section executes a predetermined drive pattern of the plurality of drive patterns without selecting and executing the drive pattern based on the machine learning.

According to the discharge lamp drive device related to the aspect of the invention, the control section selects any one of the drive patterns based on the machine learning, and then executes the drive pattern thus selected. Therefore, by performing the machine learning, even in the case in which the individual difference exists between the discharge lamps, it is possible to select the preferable drive pattern in accordance with the individual difference between the discharge lamps. Therefore, according to the discharge lamp drive device related to the aspect of the invention, the life of the discharge lamp can be extended irrespective of the individual difference between the discharge lamps.

Incidentally, there can be assumed the case in which there occurs a problem from a viewpoint other than the life of the discharge lamp only by using the machine learning alone. Therefore, in the case of using the machine learning alone, although the life of the discharge lamp can be extended, the convenience and the amenity for the user using the equipment such as the projector equipped with the discharge lamp degrade in some cases although the life of the discharge lamp can be extended.

In contrast, according to the discharge lamp lighting device related to the aspect of the invention, in the case in which the predetermined condition is fulfilled, the predetermined drive pattern is executed without selecting and executing the drive pattern based on the machine learning. Therefore, separately from the control based on the machine learning, it is possible to select and execute a suitable drive pattern for each of individual problems irrespective of the machine learning. Thus, according to the discharge lamp lighting device related to the aspect of the invention, it is possible to enhance the convenience and the amenity of the user while extending the life of the discharge lamp based on the machine learning.

The aspect of the invention may be configured such that the discharge lamp drive device further includes a voltage detection section adapted to detect an inter-electrode voltage of the discharge lamp, in a case in which the predetermined condition is not fulfilled, the control section controls the discharge lamp driver so that a mixed period is provided, the mixed period in which a first period in which AC current is supplied to the discharge lamp and a second period in which DC current is supplied to the discharge lamp are alternately repeated, the predetermined condition includes that the inter-electrode voltage is lower than a first predetermined voltage value, in a case in which the inter-electrode voltage is lower than the first predetermined voltage value, the control section executes a drive pattern including a low-frequency period as the predetermined drive pattern, and in the low-frequency period, the AC current having a frequency lower than a frequency of the AC current supplied in the first period is supplied to the discharge lamp.

According to this configuration, in the case in which the inter-electrode voltage becomes relatively low, namely in the case in which the projections of the first electrode and the second electrode grow too much and thus, the inter-electrode distance becomes relatively short, it is possible to execute the drive pattern including the low-frequency period irrespective of the machine learning. Thus, it is possible to prevent a mercury bridge from occurring.

The aspect of the invention may be configured such that the predetermined condition includes a condition that the inter-electrode voltage is lower than the first predetermined voltage value and a drive power supplied to the discharge lamp is higher than a predetermined power value, in a case in which the inter-electrode voltage is lower than the first predetermined voltage value and in a case in which the drive power is higher than the predetermined electrical power value, the control section executes a drive pattern including the low-frequency period and a third period as the predetermined drive pattern, the third period alternately including a first DC period in which DC current is supplied to the discharge lamp, and a second DC period in which DC current having an opposite polarity to a polarity of the DC current supplied in the first DC period is supplied to the discharge lamp, the length of the second DC period is shorter than 0.5 ms, and a sum of the lengths of the first DC periods in the third period is larger than a length of the second period.

According to this configuration, in the case in which the drive power is equal to or higher than a predetermined electrical power value, namely in the case in which the drive power is relatively high, it is possible to execute the drive pattern including the third period. Thus, it is possible to make the thermal load to be applied to the first electrode and the second electrode excessively high, and it is possible to crush the projections. Therefore, it is possible to preferably shorten the projections having grown too much to prevent the mercury bridge.

The aspect of the invention may be configured such that the low-frequency period has a first AC period and a second AC period, and a frequency of AC current supplied in the first AC period and a frequency of AC current supplied in the second AC period are different from each other.

According to this configuration, it is possible to make it easy to grow the projections when restoring the control based on the machine learning while shortening the projections of the first electrode and the second electrode to prevent the mercury bridge.

The aspect of the invention may be configured such that the predetermined condition includes a condition that a proportion of a change of a drive power supplied to the discharge lamp is a proportion no lower than a predetermined proportion.

According to this configuration, in the case in which the drive power has rapidly changed, it is possible to execute a predetermined drive pattern capable of preferably suppressing the flickers. Therefore, it is possible to prevent the flickers from occurring in the discharge lamp, and in the case in which, for example, the discharge lamp is installed in the projector, it is possible to prevent the image projected from the projector from flickering. As a result, the amenity of the user can be enhanced.

The aspect of the invention may be configured such that in a case in which the predetermined condition is not fulfilled, the control section controls the discharge lamp driver to execute a first drive pattern so that a mixed period is provided, the mixed period in which a first period in which AC current having a frequency is supplied to the discharge lamp and a second period in which DC current is supplied to the discharge lamp are alternately repeated, in a case in which the proportion of the change of the drive power is no lower than the predetermined proportion, the control section executes a second drive pattern different from the first drive pattern as the predetermined drive pattern, the second drive pattern includes the mixed period, a length of the first period in the second drive pattern is larger than a length of the first period in the first drive pattern, and a frequency of the AC current in the first period in the second drive pattern is higher than a frequency of the AC current in the first period in the first drive pattern.

According to this configuration, it is possible to shorten the time during which the polarity is kept constant, and it is possible to melt/solidify only a part of each of the first electrode and the second electrode to thereby grow the first electrode and the second electrode while stabling the positions of the luminescent points of the arc discharge. Thus, it is possible to promptly form the elongated small projections. Since the small projections are formed, the luminescent points of the arc discharge are stabilized at the tip positions of the small projections. Therefore, the luminescent points of the arc discharge are prevented from migrating. Therefore, according to this configuration, it is possible to prevent the flickers from occurring in the case in which the drive power varies rapidly.

The aspect of the invention may be configured such that a length of the second period in the second drive pattern is smaller than a length of the second period in the first drive pattern.

According to this configuration, it is possible to appropriately reduce the thermal load to be applied to the first electrode and the second electrode to thereby narrow the area to be melted in each of the first electrode and the second electrode. Thus, it is easy to promptly form the small projections. Therefore, it is possible to more preferably suppress the flickers of the discharge lamp.

The aspect of the invention may be configured such that the first drive pattern and the second drive pattern each include a third period alternately including a first DC period in which DC current is supplied to the discharge lamp, and a second DC period in which DC current having an opposite polarity to a polarity of the DC current supplied in the first DC period is supplied to the discharge lamp, a length of the first DC period is larger than a length of the second DC period, the length of the second DC period is shorter than 0.5 ms, a sum of the lengths of the first DC periods in the third period is larger than a length of the second period, and a length of the third period in the second drive pattern is smaller than a length of the third period in the first drive pattern.

According to this configuration, it is possible to more appropriately reduce the thermal load to be applied to the first electrode and the second electrode to thereby narrow the area to be melted in each of the first electrode and the second electrode. Thus, it is easy to promptly form the small projections. Therefore, it is possible to more preferably suppress the flickers of the discharge lamp.

The aspect of the invention may be configured such that the discharge lamp drive device further includes a voltage detection section adapted to detect an inter-electrode voltage of the discharge lamp, the control section switches from the second drive pattern to the drive pattern based on the machine learning based on one of a length of an execution time of the second drive pattern and the inter-electrode voltage.

According to this configuration, it is possible to prevent the time for executing the second drive pattern from increasing. Thus, it is possible to increase the proportion of the time during which the machine learning is performed to further extend the life of the discharge lamp.

The aspect of the invention may be configured such that in a case in which the inter-electrode voltage decreases by a predetermined value or more after starting an execution of the second drive pattern, the control section switches from the second drive pattern to the drive pattern based on the machine learning.

According to this configuration, even if the second drive pattern is terminated in the case in which the inter-electrode voltage has dropped as much as a value equal to or larger than the predetermined value, since the small projections are formed, it is possible to suppress the flickers. Therefore, it is easy to further suppress the flickers while shortening the execution time of the second drive pattern to further extend the life of the discharge lamp.

The aspect of the invention may be configured such that the predetermined condition includes a condition that an input section adapted to receive an execution input of the second drive pattern has received the execution input of the second drive pattern, and in a case in which the input section has received the execution input of the second drive pattern, the control section switches from the drive pattern presently executed to the second drive pattern.

According to this configuration, for example, in the case in which the discharge lamp is installed in the projector, in the case in which the user using the projector has felt flickering in the image projected, it is possible to execute the second drive pattern by performing the predetermined input operation on the input section. Thus, in the case in which the flickers occur, it is possible for the user to resolve or reduce the flickers by performing the input to the input section. Therefore, it is possible to enhance the convenience and the amenity of the user.

The aspect of the invention may be configured such that the predetermined condition includes a condition that an input section adapted to receive a switching input of the drive pattern has received the switching input of the drive pattern, and in a case in which the input section has received the switching input of the drive pattern, the control section switches from the drive pattern presently executed to another drive pattern.

According to this configuration, for example, in the case in which the discharge lamp is installed in the projector, in the case in which the user using the projector has felt flickering in the image projected, it is possible to execute another drive pattern by performing the predetermined input operation on the input section. Thus, in the case in which the flickers occur, it is possible for the user to forcibly switch from the drive pattern causing the flickers to easily resolve or reduce the flickers by performing the input to the input section. Therefore, it is possible to enhance the convenience and the amenity of the user.

The aspect of the invention may be configured such that the control section is configured to prevent the execution of the drive pattern having been executed immediately before switching of the drive pattern for a given time from the switching of the drive pattern based on the input received by the input section.

There is a high possibility that the drive pattern executed immediately before the switching is the drive pattern having caused the flickers. Therefore, according to this configuration, since this drive pattern is not used for a given period of time, it is possible to further prevent the flickers from occurring.

The aspect of the invention may be configured such that the predetermined condition includes a condition that short-term lighting in which a lighting time of one lighting operation of the discharge lamp is no more than a first predetermined time is executed continuously a predetermined number of times, and that the short-term lighting is performed in a proportion no smaller than a predetermined proportion to a total lighting time of the discharge lamp, in a case in which the predetermined condition is not fulfilled, the control section executes the first drive pattern, and in a case in which the short-term lighting has been performed continuously the predetermined number of times, or a case in which the short-term lighting has been performed in the proportion no smaller than the predetermined proportion, the control section executes a drive pattern for a second predetermined time, the drive pattern having a higher thermal load applied to the first electrode and the second electrode than that in the first drive pattern.

According to this configuration, it is possible to melt the projections of the first electrode and the second electrode having been deformed by the continuous short-term lighting with the relatively high thermal load and then reform the projections. Thus, it is easy to resolve the deformation of the projections, and it is possible to prevent the flickers from occurring.

A light source device according to an aspect of the invention includes a discharge lamp adapted to emit light, and any one of the discharge lamp drive devices described above.

According to the light source device related to the aspect of the invention, since the discharge lamp drive device described above is provided, it is possible to extend the life of the discharge lamp, and at the same time enhance the convenience and the amenity of the user.

A projector according to an aspect of the invention includes the light source device described above, a light modulation device adapted to modulate light emitted from the light source device in accordance with an image signal, and a projection optical system adapted to project the light modulated by the light modulation device.

According to the projector related to the aspect of the invention, since the light source device described above is provided, it is possible to extend the life of the discharge lamp, and at the same time enhance the convenience and the amenity of the user.

A discharge lamp drive method according to an aspect of the invention is a discharge lamp drive method adapted to supply a drive current to a discharge lamp having a first electrode and a second electrode to drive the discharge lamp, the method including the steps of selecting one drive pattern of plurality of drive patterns of the drive current based on machine learning, executing the selected drive pattern, and executing, in a case in which a predetermined condition is fulfilled, a predetermined drive pattern of the plurality of drive patterns without selecting and executing the drive pattern based on the machine learning.

According to the discharge lamp drive method related to the aspect of the invention, it is possible to extend the life of the discharge lamp, and at the same time enhance the convenience and the amenity of the user in substantially the same manner as described above.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
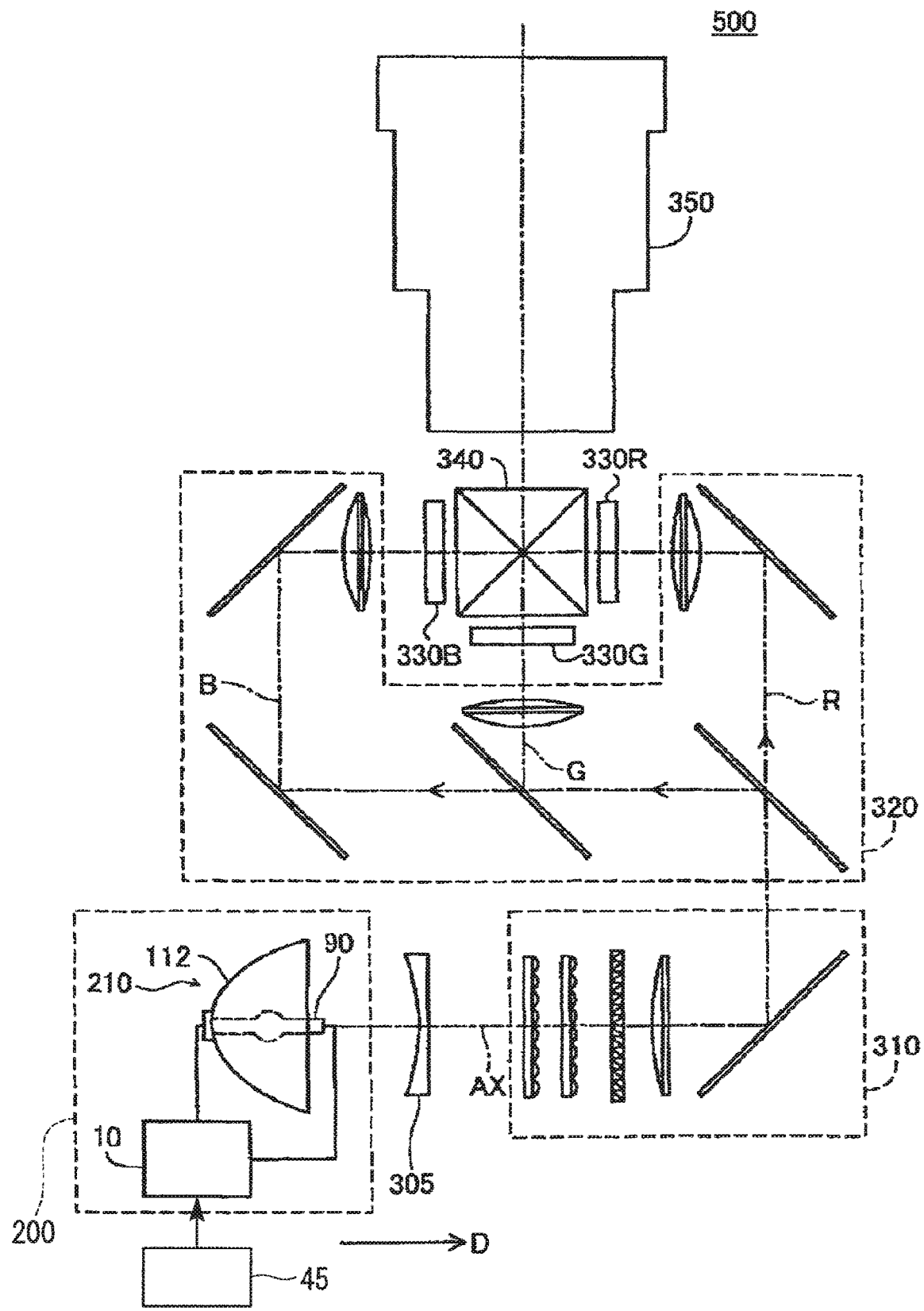
FIG. 1 is a schematic configuration diagram showing a projector according to an embodiment of the invention.

A projector according to an embodiment of the invention will hereinafter be described with reference to the accompanying drawings.

It should be noted that the scope of the invention is not limited to the embodiment hereinafter described, but can arbitrarily be modified within the technical idea or the technical concept of the invention. Further, in the drawings described below, the actual structures and the structures of the drawings are made different from each other in scale size, number, and so on of each of the constituents in some cases in order to make the constituents easy to understand.

FIG. 1 is a schematic configuration diagram showing the projector 500 according to the present embodiment. As shown in FIG. 1, the projector 500 according to the present embodiment is provided with a light source device 200, a collimating lens 305, an illumination optical system 310, a color separation optical system 320, three liquid crystal light valves (light modulation devices) 330R, 330G and 330B, a cross dichroic prism 340, and a projection optical system 350.

The light emitted from the light source device 200 passes through the collimating lens 305, and then enters the illumination optical system 310. The collimating lens 305 collimates the light from the light source device 200.

The illumination optical system 310 adjusts the illuminance of the light emitted from the light source device 200 so as to be homogenized on the liquid crystal light valves 330R, 330G, and 330B. Further, the illumination optical system 310 uniforms the polarization direction of the light emitted from the light source device 200 into one direction. The reason therefor is to effectively utilize the light emitted from the light source device 200 in the liquid crystal light valves 330R, 330G and 330B.

The light adjusted in the illuminance and the polarization direction enters the color separation optical system 320. The color separation optical system 320 separates the incident light into three colored light beams, namely a red light beam (R), a green light beam (G), and a blue light beam (B). The liquid crystal light valves 330R, 330G and 330B associated with the respective colored light beams modulate the three colored light beams, respectively, in accordance with an image signal. The liquid crystal light valves 330R, 330G and 330B are provided with liquid crystal panels 560R, 560G, and 560B described later, and polarization plates (not shown), respectively. The polarization plates are disposed on the light incident side and the light exit side of each of the liquid crystal panels 560R, 560G, and 560B.

The three colored light beams thus modulated are combined with each other by the cross dichroic prism 340. The composite light enters the projection optical system 350. The projection optical system 350 projects the incident light on a screen 700 (see FIG. 3). Thus, an image is displayed on the screen 700. It should be noted that a known configuration can be adopted as a configuration of each of the collimating lens 305, the illumination optical system 310, the color separation optical system 320, the cross dichroic prism 340, and the projection optical system 350.

Figure 2:
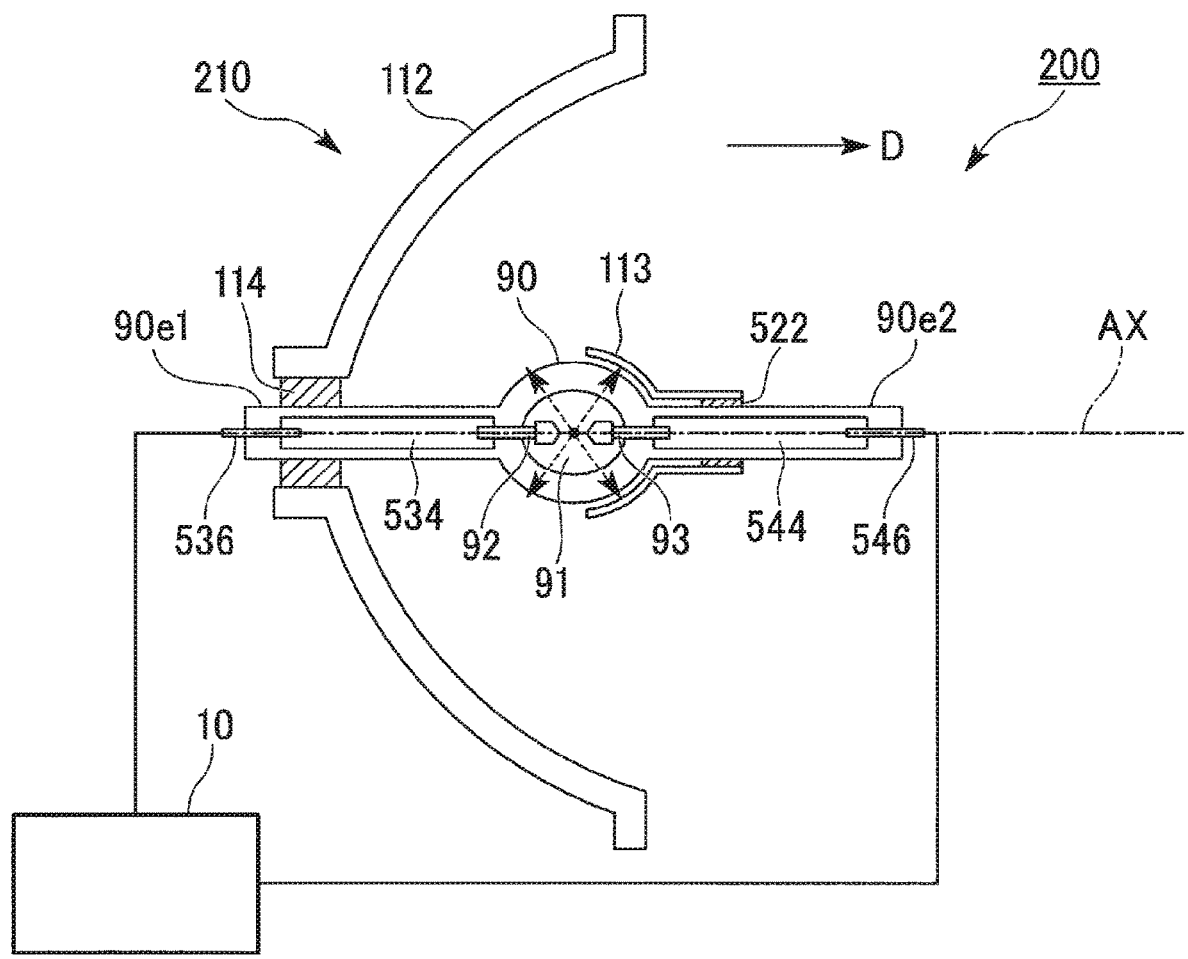
FIG. 2 is a diagram showing a discharge lamp in the embodiment.

FIG. 2 is a cross-sectional view showing a configuration of the light source device 200. The light source device 200 is provided with a light source unit 210 and a discharge lamp lighting device (discharge lamp drive device) 10. FIG. 2 shows a cross-sectional view of the light source unit 210. The light source unit 210 is provided with a main reflecting mirror 112, a discharge lamp 90, and a sub-reflecting mirror 113.

The discharge lamp lighting device 10 supplies the discharge lamp 90 with a drive current I to thereby light the discharge lamp 90. The main reflecting mirror 112 reflects the light, which is emitted from the discharge lamp 90, toward an irradiation direction D. The irradiation direction D is parallel to an optical axis AX of the discharge lamp 90.

The discharge lamp 90 has a rod-like shape extending along the irradiation direction D. One end part of the discharge lamp 90 is defined as a first end portion 90e1, and the other end part of the discharge lamp 90 is defined as a second end portion 90e2. A material of the discharge lamp 90 is a light transmissive material such as quartz glass. A central portion of the discharge lamp 90 bulges to have a spherical shape, and a discharge space 91 is formed inside the central portion. In the discharge space 91, there is encapsulated a gas as a discharge medium including a noble gas, a metallic halide, or the like.

In the discharge space 91, there are projected the tips of the first electrode 92 and the second electrode 93. The first electrode 92 is disposed on the first end portion 90e1 side of the discharge space 91. The second electrode 93 is disposed on the second end portion 90e2 side of the discharge space 91. Each of the first electrode 92 and the second electrode 93 has a rod-like shape extending along the optical axis AX. In the discharge space 91, there are disposed electrode tip portions of the first electrode 92 and the second electrode 93 so as to be opposed to each other with a predetermined distance. The material of the first electrode 92 and the second electrode 93 is metal such as tungsten.

The first end portion 90e1 of the discharge lamp 90 is provided with a first terminal 536. The first terminal 536 and the first electrode 92 are electrically connected to each other with a conductive member 534 penetrating the inside of the discharge lamp 90. Similarly, the second end portion 90e2 of the discharge lamp 90 is provided with a second terminal 546. The second terminal 546 and the second electrode 93 are electrically connected to each other with a conductive member 544 penetrating the inside of the discharge lamp 90. The material of the first terminal 536 and the second terminal 546 is metal such as tungsten. As the material of the conductive members 534, 544, there is used, for example, molybdenum foil.

The first terminal 536 and the second terminal 546 are connected to the discharge lamp lighting device 10. The discharge lamp lighting device 10 supplies the first terminal 536 and the second terminal 546 with the drive current I for driving the discharge lamp 90. As a result, arc discharge is caused between the first electrode 92 and the second electrode 93. The light (discharge light) generated by the arc discharge is emitted from the discharge position in all directions as indicated by the dashed arrows.

The main reflecting mirror 112 is fixed to the first end portion 90e1 of the discharge lamp 90 with a fixation member 114. Out of the discharge light, the light proceeding toward the opposite direction to the irradiation direction D is reflected by the main reflecting mirror 112 toward the irradiation direction D. The shape of the reflecting surface (the surface on the discharge lamp 90 side) of the main reflecting mirror 112 is not particularly limited as long as the discharge light can be reflected toward the irradiation direction D, and can also be, for example, a spheroidal shape or a paraboloidal shape. In the case of, for example, adopting the paraboloidal shape as the shape of the reflecting surface of the main reflecting mirror 112, the main reflecting mirror 112 is capable of converting the discharge light into the light roughly parallel to the optical axis AX. Thus, the collimating lens 305 can be eliminated.

The sub-reflecting mirror 113 is fixed to the second end portion 90e2 side of the discharge lamp 90 with a fixation member 522. A reflecting surface (a surface on the discharge lamp 90 side) of the sub-reflecting mirror 113 has a spherical shape surrounding a part on the second end portion 90e2 side of the discharge space 91. Out of the discharge light, the light proceeding toward the opposite side to the side where the main reflecting mirror 112 is disposed is reflected by the sub-reflecting mirror 113 toward the main reflecting mirror 112. Thus, the utilization efficiency of the light radiated from the discharge space 91 can be improved.

The material of the fixation members 114, 522 is not particularly limited as long as the material is a heat-resistant material tolerable to the heat generated by the discharge lamp 90, and is, for example, an inorganic adhesive. As the method of fixing the arrangement of the main reflecting mirror 112 and the sub-reflecting mirror 113 with respect to the discharge lamp 90, an arbitrary method can be adopted besides the method of fixing the main reflecting mirror 112 and the sub-reflecting mirror 113 to the discharge lamp 90. For example, it is also possible to fix the discharge lamp 90 and the main reflecting mirror 112 independently to a housing (not shown) of the projector 500. The same applies to the sub-reflecting mirror 113.

A circuit configuration of the projector 500 will hereinafter be described.

Figure 3:
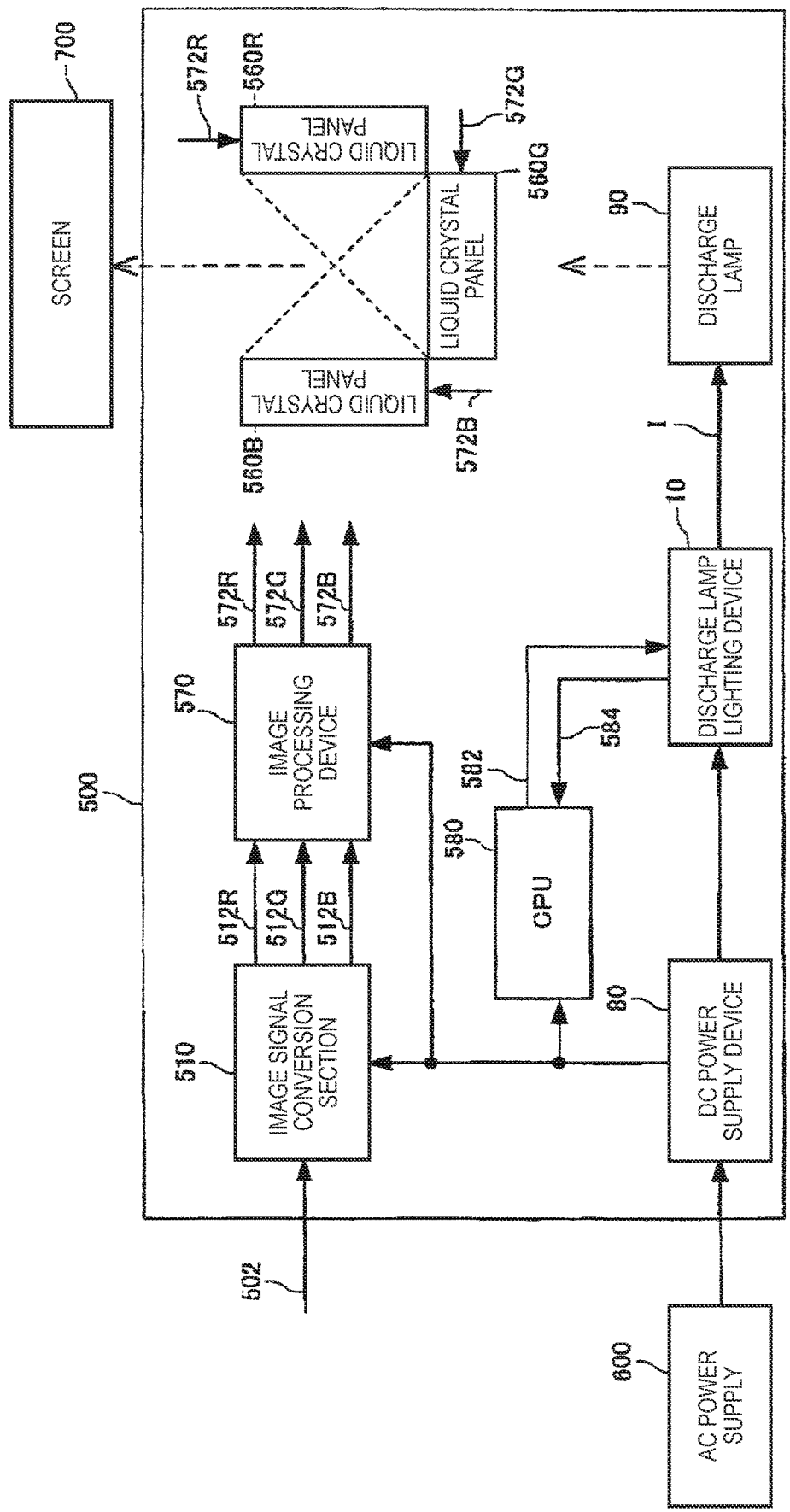
FIG. 3 is a block diagram showing a variety of constituents of the projector according to the embodiment.

FIG. 3 is a diagram showing an example of the circuit configuration of the projector 500 according to the present embodiment. The projector 500 is provided with an image signal conversion section 510, a DC power supply device 80, liquid crystal panels 560R, 560G and 560B, an image processing device 570, and a central processing unit (CPU) 580 besides the optical system shown in FIG. 1.

The image signal conversion section 510 converts an image signal 502 (e.g., a luminance/color-difference signal or an analog RGB signal) input from the outside into a digital RGB signal of a predetermined word length to thereby generate image signals 512R, 512G and 512B, and then supplies the image signals 512R, 512G and 512B to the image processing device 570.

The image processing device 570 performs image processing on each of the three image signals 512R, 512G and 512B. The image processing device 570 supplies the liquid crystal panels 560R, 560G and 560B with drive signals 572R, 572G and 572B for driving the liquid crystal panels 560R, 560G and 560B, respectively.

The DC power supply device 80 converts the AC voltage supplied from an external AC power supply 600 into a constant DC voltage. The DC power supply device 80 supplies the DC voltage to the image signal conversion section 510 and the image processing device 570 located on the secondary side of a transformer (not shown, but included in the DC power supply device 80) and the discharge lamp lighting device 10 located on the primary side of the transformer.

The discharge lamp lighting device 10 generates a high voltage between the electrodes of the discharge lamp 90 at the time of startup to cause insulation breakdown to thereby form a discharge path. Thereafter, the discharge lamp lighting device 10 supplies the drive current I for the discharge lamp 90 to keep the discharge.

The liquid crystal panels 560R, 560G, and 560B are provided respectively to the liquid crystal light valves 330R, 330G, and 330B described above. The transmittance (luminance) of the colored light beams entering the liquid crystal panels 560R, 560G, and 560B via the optical system described above is modulated by liquid crystal panels 560R, 560G, and 560B based on the drive signals 572R, 572E and 572B, respectively.

The CPU 580 controls a variety of operations of the projector 500 from the start of lighting to the extinction. For example, in the example shown in FIG. 3, a lighting command and an extinction command are output to the discharge lamp lighting device 10 via a communication signal 582. The CPU 580 receives lighting information of the discharge lamp 90 from the discharge lamp lighting device 10 via the communication signal 584.

A configuration of the discharge lamp lighting device 10 will hereinafter be described.

Figure 4:
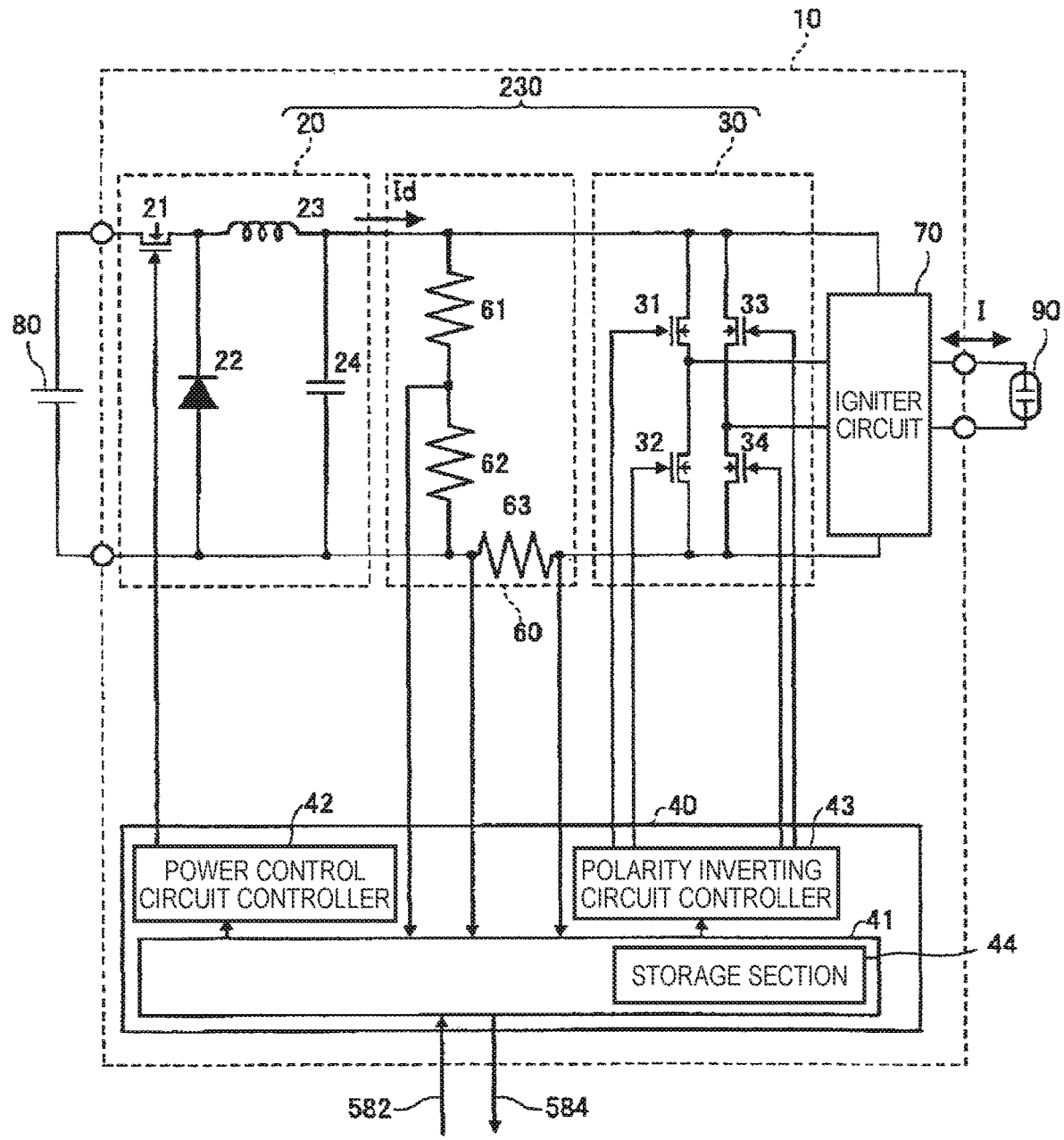
FIG. 4 is a circuit diagram of a discharge lamp lighting device of the embodiment.

FIG. 4 is a diagram showing an example of a circuit configuration of the discharge lamp lighting device 10.

As shown in FIG. 4, the discharge lamp lighting device 10 is provided with a power control circuit 20, a polarity inverting circuit 30, a control section 40, an operation detection section 60, and an igniter circuit 70.

The power control circuit 20 generates drive power Wd to be supplied to the discharge lamp 90. In the present embodiment, the power control circuit 20 is formed of a down-chopper circuit receiving a voltage from the DC power supply device 80 as an input, and stepping down the input voltage to output a DC current Id.

The power control circuit 20 is configured including a switch element 21, a diode 22, a coil 23, and a capacitor 24.

The switch element 21 is formed of, for example, a transistor. In the present embodiment, one end of the switch element 21 is connected to a positive voltage side of the DC power supply device 80, and the other end thereof is connected to the cathode terminal of the diode 22 and one end of the coil 23.

One end of the capacitor 24 is connected to the other end of the coil 23, and the other end of the capacitor 24 is connected to an anode terminal of the diode 22 and a negative voltage side of the DC power supply device 80. A current control signal is input to the control terminal of the switch element 21 from the control section 40 described later, and thus, ON/OFF of the switch element 21 is controlled. As the current control signal, a pulse width modulation (PWM) control signal can be used, for example.

When the switch element 21 is switched ON, a current flows through the coil 23, and energy is stored in the coil 23. Subsequently, when the switch element 21 is switched OFF, the energy stored in the coil 23 is released in the path passing through the capacitor 24 and the diode 22. As a result, the DC current Id according to a proportion of the ON time of the switch element 21 is generated.

The polarity inverting circuit 30 inverts the polarity of the DC current Id input from the power control circuit 20 at a predetermined timing. Thus, the polarity inverting circuit 30 generates and outputs the drive current I as a DC current lasting for the controlled time, or the drive current I as an AC current with an arbitrary frequency. In the present embodiment, the polarity inverting circuit 30 is formed of an inverter bridge circuit (a full bridge circuit).

The polarity inverting circuit 30 includes a first switch element 31, a second switch element 32, a third switch element 33, and a fourth switch element 34 each formed of, for example, a transistor. The polarity inverting circuit 30 has a configuration in which the first switch element 31 and the second switch element 32 connected in series to each other, and the third switch element 33 and the fourth switch element 34 connected in series to each other are corrected in parallel to each other. Polarity inverting control signals are input from the control section 40 to control terminals of the first switch element 31, the second switch element 32, the third switch element 33, and the fourth switch element 34, respectively. Based on the polarity inverting control signals, ON/OFF operations of the first switch element 31, the second switch element 32, the third switch element 33, and the fourth switch element 34 are controlled, respectively.

In the polarity inverting circuit 30, there is repeated an operation of alternately switching ON/OFF a pair of the first switch element 31 and the fourth switch element 34 and a pair of the second switch element 32 and the third switch element 33. Thus, the polarity of the DC current Id output from the power control circuit 20 is alternately inverted. The polarity inverting circuit 30 generates and then outputs the drive current I as a DC current keeping the same polarity state for a controlled time, or the drive current I as an AC current with a controlled frequency from a common connection point to the first switch element 31 and the second switch element 32, and a common connection point to the third switch element 33 and the fourth switch element 34.

Specifically, the polarity inverting circuit 30 is controlled so that the second switch element 32 and the third switch element 33 are in the OFF state while the first switch element 31 and the fourth switch element 34 are in the ON state, and the second switch element 32 and the third switch element 33 are in the ON state while the first switch element 31 and the fourth switch element 34 are in the OFF state. Therefore, while the first switch element 31 and the fourth switch element 34 are in the ON state, there is generated the drive current I flowing from one end of the capacitor 24 through the first switch element 31, the discharge lamp 90, and the fourth switch element 34 in this order. While the second switch element 32 and the third switch element 33 are in the ON state, there is generated the drive current I flowing from one end of the capacitor 24 through the third switch element 33, the discharge lamp 90, and the second switch element 32 in this order.

In the present embodiment, a part obtained by combining the power control circuit 20 and the polarity inverting circuit 30 with each other corresponds to a discharge lamp driver 230. In other words, the discharge lamp driver 230 supplies the discharge lamp 90 with the drive current I for driving the discharge lamp 90.

The control section 40 controls the discharge lamp driver 230. In the example shown in FIG. 4, the control section 40 controls the power control circuit 20 and the polarity inverting circuit 30 to thereby control parameters such as the holding time during which the drive current I stays at the same polarity, and the current value (the electrical power value of the drive power Wd) and the frequency of the drive current I. The control section 40 performs the polarity inverting control for controlling the holding time during which the drive current I lasts in the same polarity, and the frequency and other parameters of the drive current I on the polarity inverting circuit 30 based on the polarity inverting timing of the drive current I. The control section 40 performs, on the power control circuit 20, the current control for controlling the current value of the DC current Id output from the power control circuit 20.

In the present embodiment, the control section 40 is capable of performing, for example, the AC drive operation and the DC drive operation. The AC drive operation is the drive operation in which the AC current is supplied to the discharge lamp 90. The DC drive operation is the drive operation in which the DC current is supplied to the discharge lamp 90. A drive current waveform of the drive current I supplied to the discharge lamp 90 due to each of the types of the discharge lamp drive operation will be described in detail in the latter part.

The configuration of the control section 40 is not particularly limited. In the present embodiment, the control section 40 is configured including a system controller 41, a power control circuit controller 42, and a polarity inverting circuit controller 43. It should be noted that it is also possible to configure a part or the whole of the control section 40 with a semiconductor integrated circuit.

The system controller 41 controls the power control circuit controller 42 and the polarity inverting circuit controller 43 to thereby control the power control circuit 20 and the polarity inverting circuit 30. It is also possible for the system controller 41 to control the power control circuit controller 42 and the polarity inverting circuit controller 43 based on a lamp voltage (inter-electrode voltage) V1$a$ and the drive current I detected by the operation detection section 60.

In the present embodiment, a storage section 44 is connected to the system controller 41.

It is also possible for the system controller 41 to control the power control circuit 20 and the polarity inverting circuit 30 based on the information stored in the storage section 44. The storage section 44 stores a plurality of drive patterns DW of the drive current I. More specifically, the storage section 44 stores, for example, information related to the drive parameters such as length of time during which the drive operation is performed, and the current value, the frequency, the number of periods, the polarity, the waveform, the modulation pattern and so on of the drive current I related to each of the drive operations constituting each of the drive patterns DW. Each of the drive patterns DW of the drive current I includes at least one of the AC drive operation and the DC drive operation described above. The details of the drive patterns DW will be described in detail below.

The power control circuit controller 42 outputs the current control signal to the power control circuit 20 based on the control signal from the system controller 41 to thereby control the power control circuit 20.

The polarity inverting circuit controller 43 outputs the polarity inverting control signal to the polarity inverting circuit 30 based on the control signal from the system controller 41 to thereby control the polarity inverting circuit 30.

The control section 40 is capable of performing machine learning control MLC for controlling the discharge lamp driver 230 based on machine learning, and non-machine learning control NMLC for controlling the discharge lamp driver 230 based on a predetermined drive pattern DW irrespective of the machine learning. In other words, the control section 40 performs the machine learning. The control section 40 selects one of the drive patterns DW stored in the storage section 44 based on the machine learning, and then executes the drive pattern DW thus selected. The details of the machine learning will be described in detail latter. In the present embodiment, the non-machine learning control NMLC includes first voltage increase control VIC1 and second voltage increase control VIC2, flicker suppression control FRC, high-load drive control HLC, and compulsory input control CIC. The details of the control will be described in detail latter.

The control section 40 is realized using a dedicated circuit, and can be arranged to perform the control described above and a variety of types of control of processes described later. In contrast, it is also possible to arrange the control section 40 so that, for example, a CPU executes a control program stored in the storage section 44 to thereby function as a computer to perform a variety of types of control of these processes.

Figure 5:
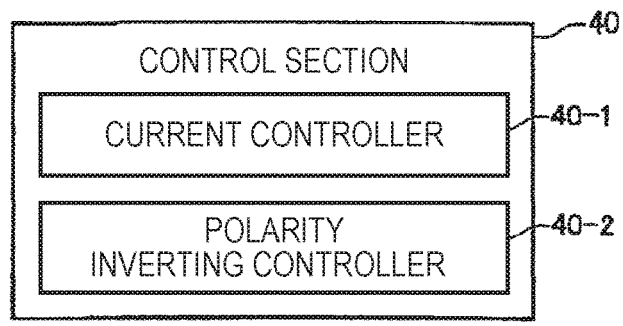
FIG. 5 is a block diagram showing a configuration example of a control section of the embodiment.

FIG. 5 is a diagram for explaining another configuration example of the control section 40. As shown in FIG. 5, the control section 40 can also be configured so as to function as a current controller 40-1 for controlling the power control circuit 20, and a polarity inverting controller 40-2 for controlling the polarity inverting circuit 30 due to the control program.

In the example shown in FIG. 4, the control section 40 is configured as a part of the discharge lamp lighting device 10. In contrast, it is also possible to adopt a configuration in which the CPU 580 assumes a part of the function of the control section 40.

In the present embodiment, the operation detection section 60 includes a voltage detection section for detecting the lamp voltage V1a of the discharge lamp 90 to output lamp voltage information to the control section 40. Further, it is also possible for the operation detection section 60 to include a current detection section for detecting the drive current I to output drive current information to the control section 40, and so on. In the present embodiment, the operation detection section 60 is configured including a first resistor 61, a second resistor 62, and a third resistor 63.

In the present embodiment, the voltage detection section of the operation detection section 60 detects the lamp voltage V1a using the voltage obtained by voltage dividing with the first resistor 61 and the second resistor 62 connected in series to each other and connected in parallel to the discharge lamp 90. Further, in the present embodiment, the current detection section detects the drive current I using the voltage generated in the third resistor 63 connected in series to the discharge lamp 90.

The igniter circuit 70 operates only when starting to light the discharge lamp 90. The igniter circuit 70 supplies a high voltage (a voltage higher than the voltage applied in the normal lighting of the discharge lamp 90) which is necessary for causing the dielectric breakdown between the electrodes (between the first electrode 92 and second electrode 93) of the discharge lamp 90 to form the discharge path when starting to light the discharge lamp 90, between the electrodes (between the first electrode 92 and second electrode 93) of the discharge lamp 90. In the present embodiment, the igniter circuit 70 is connected in parallel to the discharge lamp 90.

Figure 6A:
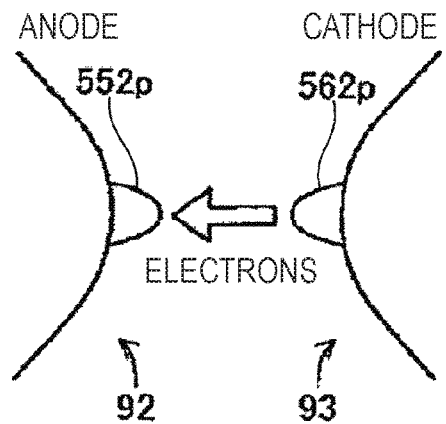
FIG. 6A is a diagram showing an appearance of projections at tips of electrodes of the discharge lamp.
Figure 6B:
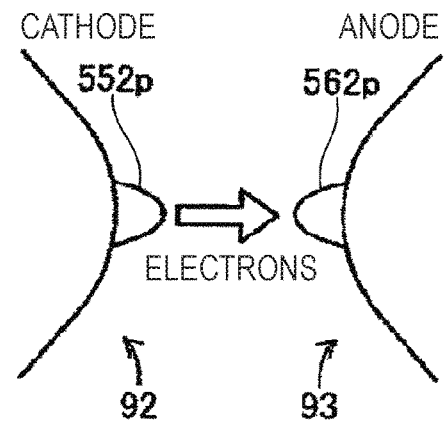
FIG. 6B is a diagram showing an appearance of the projections at the tips of the electrodes of the discharge lamp.

FIG. 6A and FIG. 6B show tip portions of the first electrode 92 and the second electrode 93. At the tips of the first electrode 92 and the second electrode 93, there are respectively formed projections 552p, 562p. FIG. 6A shows a first polarity state in which the first electrode 92 acts as an anode, and the second electrode 93 acts as a cathode. In the first polarity state, electrons migrate from the second electrode 93 (the cathode) to the first electrode 92 (the anode) due to the discharge. The electrons are emitted from the cathode (the second electrode 93). The electrons emitted from the cathode (the second electrode 93) collide with the tip of the anode (the first electrode 92). The collision causes heat, and the temperature of the tip (the projection 552p) of the anode (the first electrode 92) rises.

FIG. 6B shows a second polarity state in which the first electrode 92 acts as the cathode, and the second electrode 93 acts as the anode. In the second polarity state, in contrast to the first polarity state, electrons migrate from the first electrode 92 to the second electrode 93. As a result, the temperature of the tip (the projection 562p) of the second electrode 93 rises.

As described above, by the drive current I being supplied to the discharge lamp 90, the temperature of the anode with which the electrons collide rises. In contrast, the temperature of the cathode emitting the electrons drops while emitting the electrons toward the anode.

An inter-electrode distance between the first electrode 92 and the second electrode 93 increases with the deterioration of the projections 552p, 562p. This is because the projections 552p, 562p wear. When the inter-electrode distance increases, the resistance between the first electrode 92 and the second electrode 93 increases, and therefore, the lamp voltage V1a rises. Therefore, by referring to the lamp voltage V1a, it is possible to detect the change in the inter-electrode distance, namely a degree of deterioration of the discharge lamp 90.

It should be noted that since the first electrode 92 and the second electrode 93 have substantially the same configurations, only the first electrode 92 will be described as a representative in some cases in the following description. Further, since the projection 552p of the tip of the first electrode 92 and the projection 562p of the tip of the second electrode 93 have substantially the same configurations, only the projection 552p will be described as a representative in some cases in the following description.

An input section 45 shown in FIG. 1 is a section for receiving predetermined input by the user. The input section 45 receives input by the user such as ON/OFF of the power of the projector 500, or a change of a lighting mode. In the present embodiment, the input section 45 is connected to the control section 40 of the discharge lamp lighting device 10. In the case in which the input has been received from the user, a signal corresponding to the input is output to the control section 40 by the input section 45. The input to be received by the input section 45 will be described in detail latter.

The method of the input section 45 to receive the input is not particularly limited. It is also possible for the input section 45 to, for example, receive the input by a variety of buttons attached to the housing of the projector 500 being pushed, or by a menu displayed on the display attached to the housing of the projector 500 being operated, or receive the input by a signal transmitted from a remote controller of the projector 500. Further, it is also possible for the input section 45 to receive the input due to an operation in an electronic terminal not shown such as a personal computer (PC), a cellular phone, or a tablet connected to the projector 500 wirelessly or with wire.

The control of the discharge lamp driver 230 by the control section 40 according to the present embodiment will hereinafter be described. In the present embodiment, the control section 40 controls the discharge lamp driver 230 using at least one of the AC drive operation and the DC drive operation.

Firstly, the machine learning control MLC by the control section 40 of the present embodiment will be described. The machine learning control MLC is performed in the case in which none of predetermined conditions described later is fulfilled. In the machine learning control MLC, out of the plurality of drive patterns DW, a machine learning drive pattern (a first drive pattern) DW1 is executed. In other words, in the case in which the predetermined conditions are not fulfilled, the control section 40 executes the machine learning drive pattern DW1. There are disposed a plurality of machine learning drive patterns DW1. The machine learning drive patterns DW1 have drive current waveforms different from each other in at least one of the drive parameters in each of the drive operations constituting the drive pattern DW.

Figure 7:
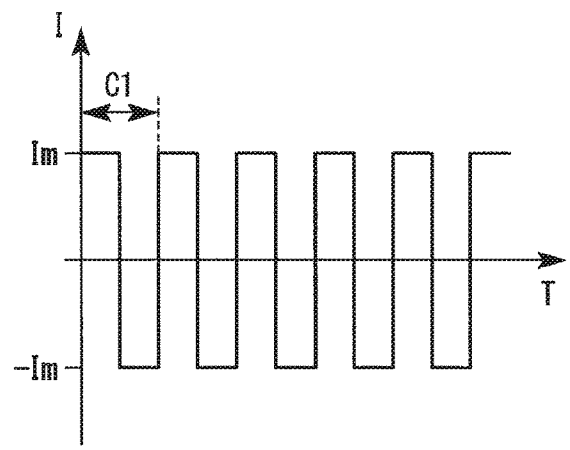
FIG. 7 is a diagram showing an example of a drive current waveform supplied to the discharge lamp in an AC drive operation of the embodiment.
Figure 8A:
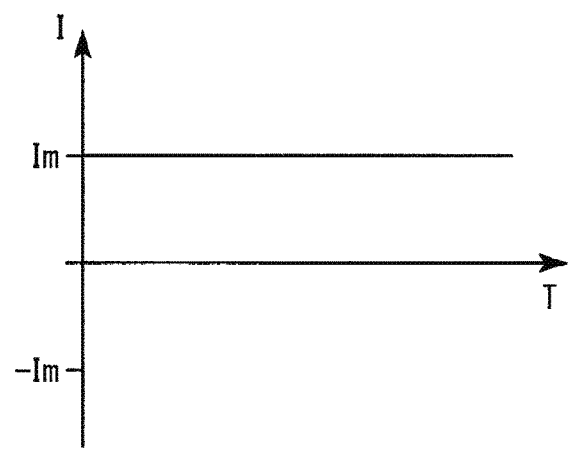
FIG. 8A is a diagram showing an example of a drive current waveform supplied to the discharge lamp in a DC drive operation of the embodiment.
Figure 8B:
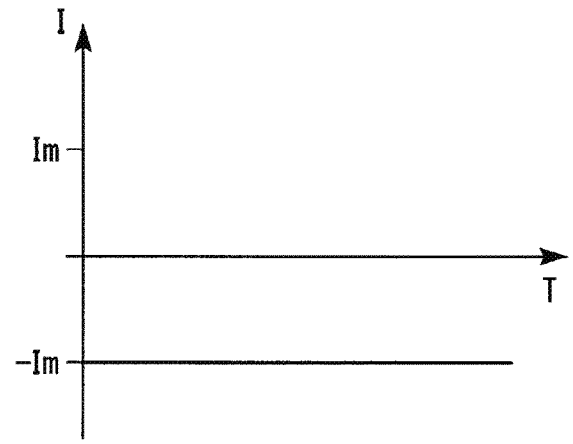
FIG. 8B is a diagram showing an example of the drive current waveform supplied to the discharge lamp in the DC drive operation of the embodiment.

Each of the drive operations will hereinafter be described. FIG. 7 is a diagram showing an example of the drive current waveform supplied to the discharge lamp 90 in the AC drive operation. FIG. 8A and FIG. 8B are each a diagram showing an example of the drive current waveform supplied to the discharge lamp 90 in the DC drive operation. In FIG. 7, FIG. 8A and FIG. 8B, the vertical axis represents the drive current I, and the horizontal axis represents time T. The drive current I is shown defining the case of the first polarity state as positive, and the case of the second polarity state as negative.

The drive current I supplied to the discharge lamp 90 in the AC drive operation shown in FIG. 7 is, for example, a rectangular wave AC current having the polarity inverted a plurality of times between the current value Im and the current value −Im. In the AC current shown in FIG. 7, the length of the period C1 is constant. The duty ratio of the AC current shown in FIG. 7 is 0.5 (50%).

The drive current I supplied to the discharge lamp 90 in the DC drive operation shown in FIG. 8A is a DC current with the first polarity having a constant current value Im. The drive current I supplied to the discharge lamp 90 in the DC drive operation shown in FIG. 8B is a DC current with the second polarity having a constant current value −Im.

Figure 9:
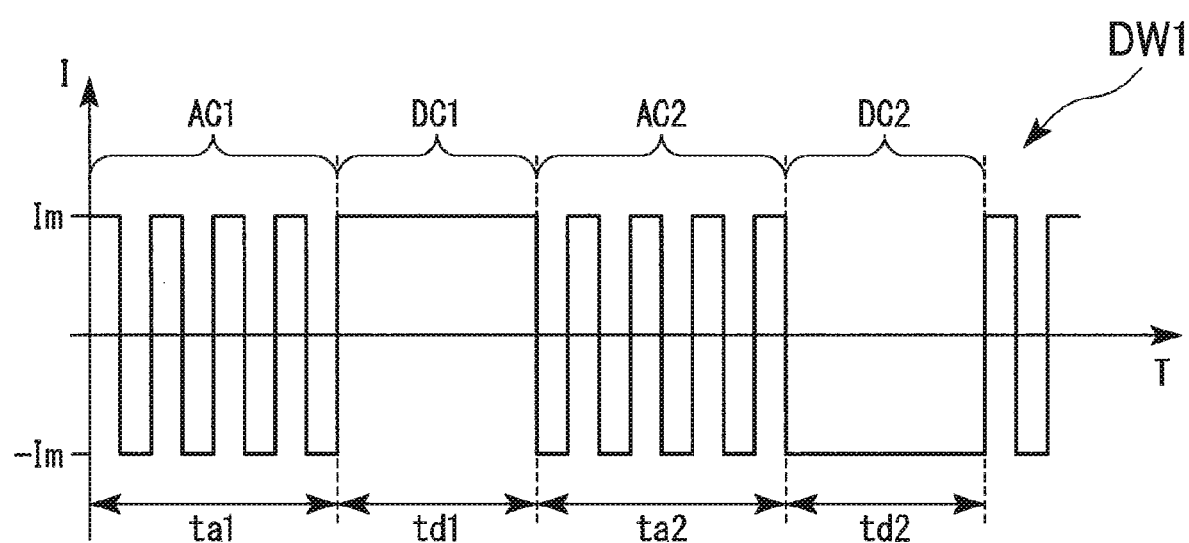
FIG. 9 is a diagram showing an example of a machine learning drive pattern of a drive current supplied to the discharge lamp in the embodiment.

FIG. 9 is a diagram showing an example of the machine learning drive pattern DW1 of the drive current I supplied to the discharge lamp 90 in the present embodiment. In FIG. 9, the vertical axis represents the drive current I, and the horizontal axis represents time T.

The machine learning drive pattern DW1 shown in FIG. 9 is constituted by the AC drive operation and the DC drive operation. More specifically, the machine learning drive pattern DW1 shown in FIG. 9 is constituted by a first AC drive operation AC1, a first DC drive operation DC1, a second AC drive operation AC2, and a second DC drive operation DC2. The period during which the first AC drive operation AC1 is performed and the period during which the second AC drive operation AC2 is performed correspond to a first period during which the AC current is supplied to the discharge lamp 90. The period during which the first DC drive operation DC1 is performed and the period during which the second DC drive operation DC2 is performed correspond to a second period during which the DC current is supplied to the discharge lamp 90. In other words, the machine learning drive pattern DW1 shown in FIG. 9 has a mixed period in which the first period and the second period are alternately repeated.

As described above, in the case in which the predetermined conditions described later are not fulfilled, the control section 40 controls the discharge driver 230 so that the mixed period is provided. In other words, in the case in which the predetermined conditions described later are not fulfilled, the control section 40 controls the discharge driver 230 so that the machine learning drive pattern (the first drive pattern) DW1 including the mixed period is provided. The number of the first periods and the number of the second periods included in the mixed period are not particularly limited.

Further, the machine learning drive pattern DW1 has a plurality of drive parameters with respect to each of the AC drive operations and each of the DC drive operations. For example, the first AC drive operation AC1 has a length ta1 of the execution time of the AC drive operation and a first frequency f1 of the AC drive operation as the drive parameters. The first DC drive operation DC1 has a length td1 of the execution time of the DC drive operation and the first polarity as the drive parameters. The second AC drive operation AC2 has a length ta2 of the execution time of the AC drive operation and a second frequency f2 of the AC drive operation as the drive parameters. The second DC drive operation DC2 has a length td2 of the execution time of the DC drive operation and the second polarity as the drive parameters.

It should be noted that in the case of the machine learning drive pattern DW1 shown in FIG. 9, it is assumed that the length ta1 of the execution time of the first AC drive operation AC1 and the length ta2 of the execution time of the second AC drive operation AC2 are the same, and further, it is also assumed that the length td1 of the execution time of the first DC drive operation DC1 and the length td2 of the execution time of the second DC drive operation DC2 are the same. Further, in the case of the machine learning drive pattern DW1 shown in FIG. 9, it is assumed that the first frequency f1 of the AC current in the first AC drive operation AC1 and the second frequency f2 of the AC current in the second AC drive operation AC2 are the same.

The first frequency f1 and the second frequency f2 are, for example, no lower than 100 Hz and no higher than 1 kHz. The length ta1 of the execution time of the first AC drive operation AC1 and the length ta2 of the execution time of the second AC drive operation AC2 are, for example, no less than 10 ms (milliseconds), and no more than 10 s (seconds). The length td1 of the execution time of the first DC drive operation DC1 and the length td2 of the execution time of the second DC drive operation DC2 are, for example, no less than 10 ms (milliseconds), and no more than 40 ms (milliseconds).

The plurality of machine learning drive patterns DW1 is configured by, for example, arbitrarily combining a plurality of numerical values selected in the numerical value ranges of the respective drive parameters in each of the drive operations. For example, the number of types of the drive parameters in each of the drive operations used in the combination is preferably no less than 2 and no more than 6, and the number of numerical values prepared for each of the types of the drive parameters is preferably no less than 2 and no more than 6. By combining these to configure the plurality of machine learning drive patterns DW1, it is possible to obtain a preferable number of machine learning drive patterns DW1.

For example, the drive parameters described in the machine learning drive pattern DW1 shown in FIG. 9 described above are the length of the execution time of the AC drive operation, the frequency of the AC current in the AC drive operation, the length of the execution time of the DC drive operation, and the polarity of the DC drive operation, and in this case, the total number of the types of the drive parameters in each of the drive operations is 4.

The machine learning drive patterns DW1 are different from each other in a value of at least one of the drive parameters described above. The number of the machine learning drive patterns DW1 is, for example, no less than 3 and no more than 150. The number of the machine learning drive patterns DW1 is preferably no less than 10 and no more than 100. The number of the machine learning drive patterns DW1 is more preferably no less than 20 and no more than 30. By setting the number of the machine learning drive patterns DW1 in such a manner, the life of the discharge lamp 90 can further be extended.

Then, switching between the drive patterns DW by the control section 40 of the present embodiment will be described. The control section 40 switches between the machine learning drive patterns DW1 based on the machine learning. In the present embodiment, the control section 40 makes an evaluation of the machine learning drive pattern DW1 based on the change of the lamp voltage V1a, and then makes a selection of the machine learning drive pattern DW1 based on the evaluation of the machine learning drive pattern DW1.

Figure 10:
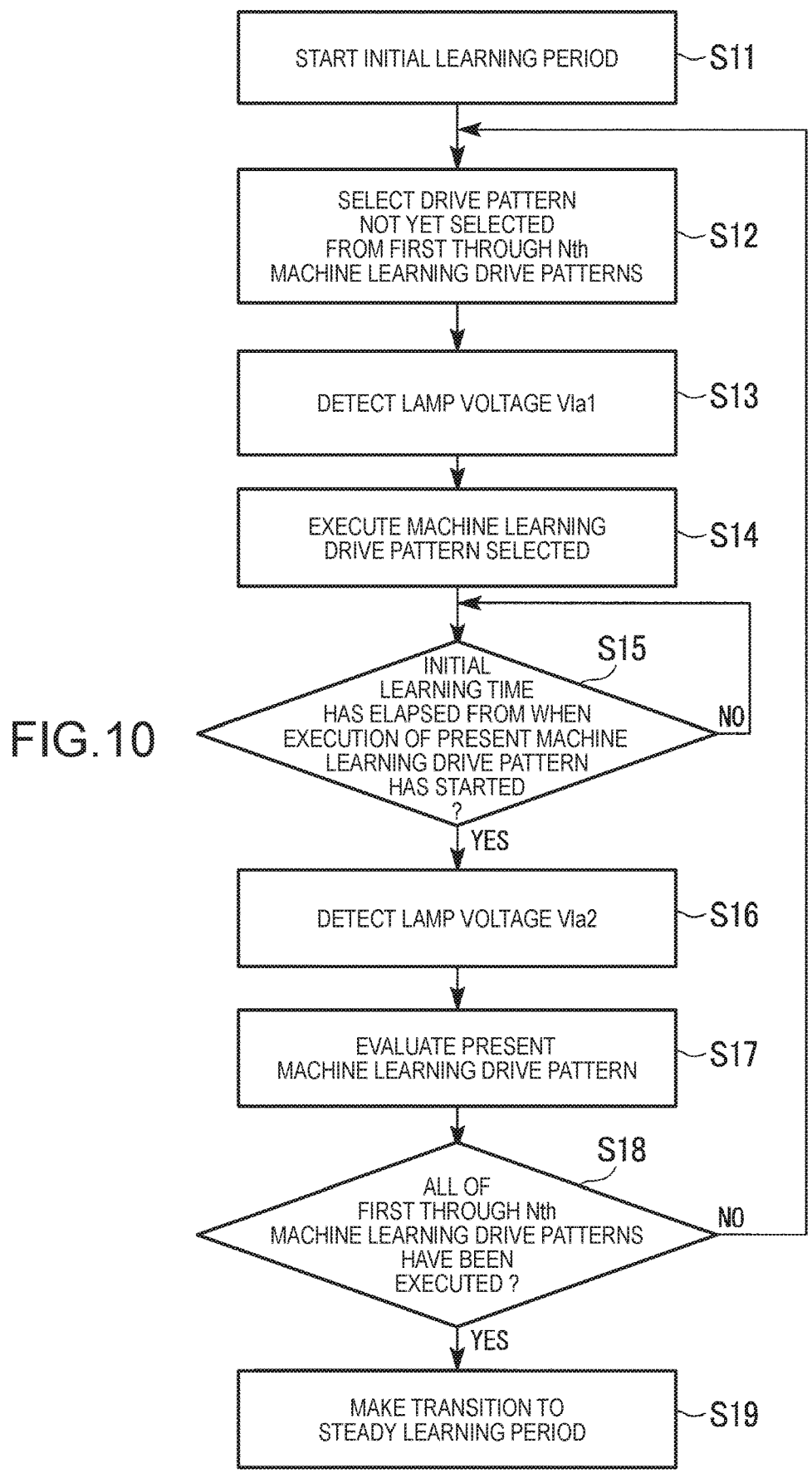
FIG. 10 is a flowchart showing an example of a control procedure of a control section in an initial learning period of the embodiment.

In the present embodiment, there are provided an initial learning period in which initial evaluations of the machine learning drive patterns DW1 are made, and a steady learning period set after the initial learning period. FIG. 10 is a flowchart showing an example of a control procedure of the control section 40 in the initial learning period. It should be noted that in the following description, it is assumed that N machine learning drive patterns DW1 are provided, and the numbers from first to Nth are assigned to the respective machine learning drive patterns DW1.

As shown in FIG. 10, the control section 40 starts (step S11) the initial learning period, and then selects (step S12) a machine learning drive pattern DW1 which has not been selected in the initial learning period out of the first through Nth machine learning drive patterns DW1. The control section 40 selects, for example, the machine learning drive pattern DW1 not having been selected at random. Since none of the machine learning drive patterns DW1 has been selected immediately after starting the initial learning period, the control section 40 selects one machine learning drive pattern DW1 from the first through Nth machine learning drive patterns DW1. Then, the voltage detection section of the operation detection section 60 detects (step S13) the lamp voltage V1a1 of the discharge lamp 90, and the control section 40 stores the lamp voltage V1a thus detected to the storage section 44. Then, the control section 40 executes (step S14) the machine learning drive pattern DW1 thus selected.

After starting the execution of the machine learning drive pattern DW1, the control section 40 determines (step S15) whether or not the initial learning time has elapsed after the execution of the machine learning drive pattern DW1 presently selected has been started. The length of the initial learning time is, for example, no less than 10 min (minutes) and no more than 120 min (minutes). In the case in which the initial learning time has not elapsed from when the execution of the machine learning drive pattern DW1 presently selected has been started (NO in the step S15), the control section 40 continues to execute the machine learning drive pattern DW1 presently selected.

In contrast, in the case in which the initial learning time has elapsed from when the execution of the machine learning drive pattern DW1 presently selected has been started (YES in the step S15), the voltage detection section of the operation detection section 60 detects (step S16) the lamp voltage V1a2 of the discharge lamp 90, and then the control section 40 stores the lamp voltage V1a2 thus detected in the storage section 44. Then, the control section 40 makes (step S17) an evaluation of the machine learning drive pattern DW1 presently selected.

In the present embodiment, the evaluation of the machine learning drive pattern DW1 is made based on the change in the lamp voltage V1a. Specifically, the control section 40 makes an evaluation of the machine learning drive pattern DW1 based on a value of the lamp voltage V1a2 obtained after the machine learning drive pattern DW1 thus selected is executed for the initial learning time, and based on a difference of the lamp voltage V1a2 obtained after the machine learning drive pattern DW1 thus selected is executed for the initial learning time from the lamp voltage V1a1 obtained before executing the machine learning drive pattern DW1 thus selected. In the following description, the difference of the lamp voltage V1a2 obtained after executing the machine learning drive pattern DW1 for the initial learning time from the lamp voltage V1a1 obtained before executing the machine learning drive pattern DW1 is called a first variation voltage value.

Here, a target numerical value range is set to the lamp voltage V1a. The control section 40 selects and executes the machine learning drive patterns DW1 so that the lamp voltage V1a can be kept in the target numerical value range if at all possible. The target numerical value range is determined in accordance with, for example, a value of the drive power Wd supplied to the discharge lamp 90. The numerical value in the target numerical value range is smaller in the case in which the drive power Wd is lower than the rated power, compared to the case in which the drive power Wd is equal to the rated power. In the case in which the drive power Wd is equal to the rated power (e.g., 215 W), the target numerical value range is, for example, no lower than 60 V and lower than 65 V. In the case in which the drive power Wd is lower than the rated power (e.g., 140 W), the target numerical value range is, for example, no lower than 53 V and lower than 59 V. By setting the target numerical value range as described above, it is easy to keep the lamp voltage V1a at an appropriate level in accordance with the drive power Wd, and it is possible to extend the life of the discharge lamp 90.

The case in which the evaluation of the machine learning drive pattern DW1 becomes relatively high is, for example, the case in which the lamp voltage V1$a$ (the lamp voltage Vla2 obtained after one machine learning drive pattern DW1 is executed for the initial learning time) falls within the target numerical value range due to the execution of the one machine learning drive pattern DW1, the case in which the lamp voltage V1$a$ comes closer to the target numerical value range due to the execution of one machine learning drive pattern DW1, and the case in which the lamp voltage V1$a$ can be kept within the target numerical value range before and after executing one machine learning drive pattern DW1. Further, the case in which the evaluation of the machine learning drive pattern DW1 is relatively low is, for example, the case in which the lamp voltage V1$a$ runs off the target numerical value range due to the execution of one machine learning drive pattern DW1, and the case in which the lamp voltage V1$a$ gets away from the target numerical value range due to the execution of one machine learning drive pattern DW1.

As an example, in the case in which the lamp voltage Vla2 obtained after executing one machine learning drive pattern DW1 for the initial learning time is higher than the target numerical value range, and at the same time, the first variation voltage value is a negative value, the evaluation of the one machine learning drive pattern DW1 thus selected is relatively high. Further, in the case in which the lamp voltage Vla2 obtained after executing one machine learning drive pattern DW1 for the initial learning time is higher than the target numerical value range, and at the same time, the first variation voltage value is a positive value, the evaluation of the one machine learning drive pattern DW1 thus selected is relatively low. In contrast, in the case in which the lamp voltage Vla2 obtained after executing one machine learning drive pattern DW1 for the initial learning time is lower than the target numerical value range, and at the same time, the first variation voltage value is a negative value, the evaluation of the one machine learning drive pattern DW1 thus selected is relatively low. Further, in the case in which the lamp voltage Vla2 obtained after executing one machine learning drive pattern DW1 for the initial learning time is lower than the target numerical value range, and at the same time, the first variation voltage value is a positive value, the evaluation of the one machine learning drive pattern DW1 thus selected is relatively high. Further, in the case in which the lamp voltage Vla2 obtained after executing one machine learning drive pattern DW1 for the initial learning time is within the target numerical value range, the smaller the absolute value of the first variation voltage value is, the relatively higher the evaluation of the one machine learning drive pattern DW1 thus selected is, and in contrast, the larger the absolute value of the first variation voltage value is, the relatively lower the evaluation of the one machine learning drive pattern DW1 thus selected is.

It should be noted that the fact that the first variation voltage value is a negative value means the fact that the lamp voltage V1$a$ has dropped due to one machine learning drive pattern DW1 executed for the initial learning time. The fact that the first variation voltage value is a positive value means the fact that the lamp voltage V1$a$ has risen due to one machine learning drive pattern DW1 executed for the initial learning time.

After evaluating the machine learning drive pattern DW1 presently selected, the control section 40 determines (step S18) whether or not all of the first through Nth machine learning drive patterns DW1 have been executed in the initial learning period. In the case in which there is a machine learning drive pattern DW1 which has not been executed in the initial learning period in the first through Nth machine learning drive patterns DW1 (NO in the step S18), the control section 40 selects and then executes another machine learning drive pattern DW1, and then evaluates the machine learning drive pattern DW1 thus selected (steps S12 through S17). In contrast, in the case in which all of the N patterns, namely the first through Nth machine learning drive patterns DW1 have been executed in the initial learning period (YES in the step S18), the control section 40 terminates the initial learning period to make (step S19) the transition to the steady learning period. The length of the initial learning period is, for example, shorter than 10 h (hours).

In the present embodiment, it is assumed that the lamp voltage V1$a$ of the discharge lamp 90 is detected by the voltage detection section of the operation detection section 60 as the lamp voltage Vla1 obtained before executing the machine learning drive pattern DW1 thus selected after selecting the machine learning drive pattern DW1 not having been selected from the plurality of machine learning drive patterns DW1 in the step S12, but this is not a limitation. The lamp voltage Vla1 obtained before executing the Xth machine learning drive pattern DW1 thus selected can be set to, for example, the lamp voltage Vla2 detected after the (X−1)th machine learning drive pattern DW1 selected immediately before the Xth machine learning drive pattern DW1 thus selected is executed for the initial learning time. By adopting such control, the detection of the lamp voltage Vla1 in the step S13 becomes unnecessary, and thus, the process of the initial evaluation can further be simplified.

Figure 11:
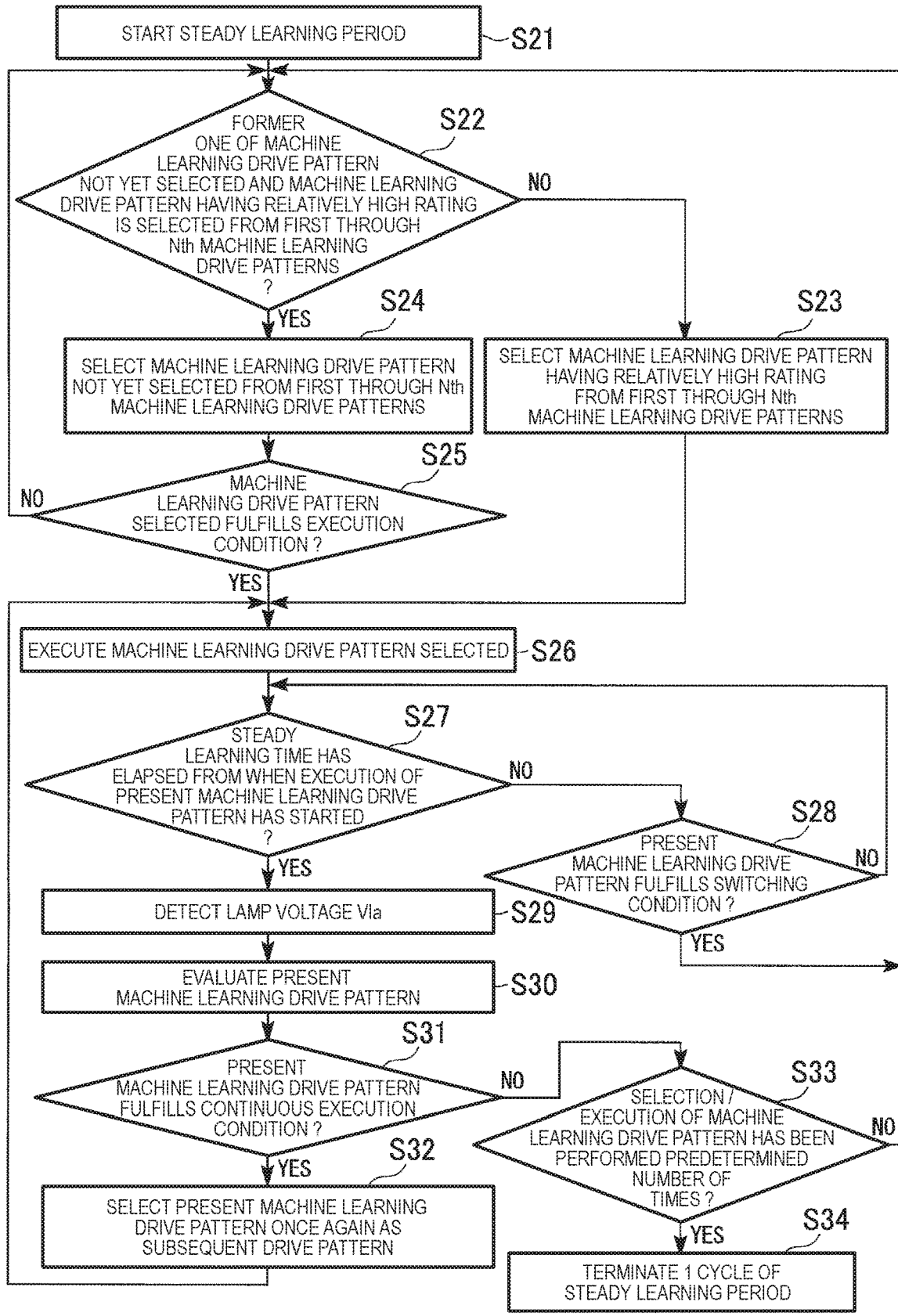
FIG. 11 is a flowchart showing an example of a control procedure of the control section in a steady learning period of the embodiment.

FIG. 11 is a flowchart showing an example of a control procedure of the control section 40 in the steady learning period. FIG. 11 shows one cycle in the steady learning period. In the steady learning period, the control section 40 repeatedly executes one cycle shown in FIG. 11. As shown in FIG. 11, the control section 40 starts (step S21) the steady learning period, and then selects either one of the machine learning drive pattern DW1 not having been selected in the steady learning period and the machine learning drive pattern DW1 having a relatively high rating out of the first through Nth machine learning drive patterns DW1 (steps S22 through S24). It should be noted that the control section 40 randomly selects the machine learning drive pattern DW1 from the first through Nth machine learning drive patterns DW1, for example.

More specifically, for example, the control section 40 determines (step S22) whether or not former one (i.e., the machine learning drive pattern DW1 not having been selected in the steady learning period) of the machine learning drive pattern DW1 not having been selected in the steady learning period and the machine learning drive pattern DW1 having a relatively high rating is selected from the first through Nth machine learning drive patterns DW1, and in the case in which the machine learning drive pattern DW1 having a relatively high rating is selected (NO in the step S22), the control section 40 selects (step S23) the machine learning drive pattern DW1 having a relatively high rating from the first through Nth machine learning drive patterns DW1. For example, the control section 40 selects the machine learning drive pattern DW1 having the highest rating, namely the machine learning drive pattern DW1 which makes the lamp voltage V1$a$ the closest to the target numerical value range (the predetermined voltage value) of the lamp voltage V1$a$, from the first through Nth machine learning drive patterns DW1. Then, the control section 40 executes (step S26) the machine learning drive pattern DW1 thus selected in the step S23.

In contrast, in the case of selecting the former one, namely the machine learning drive pattern DW1 not having been selected in the steady learning period (YES in the step S22), the control section 40 selects (step S24) the machine learning drive pattern DW1 not having been selected from the first through Nth machine learning drive patterns DW1. Then, in the case in which the machine learning drive pattern DW1 not having been selected in the steady learning period is selected, the control section 40 determines (step S25) whether or not the machine learning drive pattern DW1 thus selected fulfills the execution condition. The execution condition includes, for example, the fact that the machine learning drive pattern DW1 thus selected is not switched to another machine learning drive pattern DW1 in the step S28 described later last time the machine learning drive pattern DW1 thus selected is selected and then executed.

In the case in which the machine learning drive pattern DW1 selected in the step S24 fulfills the execution condition (YES in the step S25), the process makes the transition to the step S26, and the control section 40 executes the machine learning drive pattern DW1 thus selected. In contrast, in the case in which the machine learning drive pattern DW1 thus selected fails to fulfill the execution condition (NO in the step S25), the process makes the transition to the step S22, and the control section 40 selects another machine learning drive pattern DW1 from the first through Nth machine learning drive patterns DW1, and then performs substantially the same determination as described above.

Then, after starting the execution of the machine learning drive pattern DW1 thus selected, the control section 40 determines (step S27) whether or not the steady learning time has elapsed after the execution of the machine learning drive pattern DW1 presently selected has been started. The steady learning time determined in the step S27 is the same as, for example, the initial learning time determined in the step S15 in the initial learning period. Therefore, the length of the steady learning time is, for example, no less than 10 min (minutes) and no more than 120 min (minutes). In the case in which the steady learning time has not elapsed from when the execution of the machine learning drive pattern DW1 presently selected has been started (NO in the step S27), the control section 40 determines (step S28) whether or not the present machine learning drive pattern DW1 fulfills a switching condition.

The switching condition includes, for example, the fact that either one of a first switching condition and a second switching condition is fulfilled. The first switching condition is that the absolute value of the variation (the variation voltage value) of the lamp voltage V1a detected within the steady learning time becomes equal to or larger than a first predetermined value, and at the same time the lamp voltage V1a thus detected runs off the target numerical value range during the execution of the present machine learning drive pattern DW1. The second switching condition includes the fact that the absolute value of the variation of the lamp voltage V1a becomes equal to or larger than a second predetermined value in the case in which the time having elapsed from when the execution of the present machine learning drive pattern DW1 has started is equal to or shorter than first time. The first time is shorter than the steady learning time, and is, for example, 5 min (minutes). The second predetermined value is smaller than the first predetermined value. The first predetermined value is, for example, 5 V. The second predetermined value is, for example, 3 V.

Specifically, it is assumed that in the case in which the elapsed time is equal to or shorter than the first time, the switching condition (the second switching condition) is fulfilled even in the case in which the absolute value of the variation of the lamp voltage V1a has become equal to or larger than the second predetermined value smaller than the first predetermined value, and in the case in which the elapsed time exceeds the first time, the switching condition (the first switching condition) is not fulfilled unless the variation of the lamp voltage V1a becomes equal to or larger than the first predetermined value larger than the second predetermined value. By adopting such a relationship, the control section 40 determines the switching of the machine learning drive pattern DW1 presently selected in a phased manner based on the execution time of the machine learning drive pattern DW1 presently selected and the lamp voltage V1a.

In the case in which the machine learning drive pattern DW1 presently selected fulfills the switching condition (YES in the step S28), the control section 40 determines that the machine learning drive pattern DW1 presently selected is an undesirable machine learning drive pattern DW1 for extending the life of the discharge lamp 90 in the present state of the discharge lamp 90. Then, the control section 40 degrades the rating of the machine learning drive pattern DW1 presently selected.

Subsequently, the control section 40 performs the step S22 through the step S26 in substantially the same manner as described above to perform the selection and the execution of the next machine learning drive pattern DW1. As described above, in the case in which the variation of the lamp voltage V1a fulfills the switching condition when executing the machine learning drive pattern DW1, the control section 40 switches from the machine learning drive pattern DW1 presently selected to another machine learning drive pattern DW1.

In contrast, in the case in which the present machine learning drive pattern DW1 does not fulfill the switching condition (NO in the step S28), the control section 40 executes the machine learning drive pattern DW1 presently selected until the steady learning time elapses. Further, in the case in which the steady learning time has elapsed from when the execution of the present machine learning drive pattern DW1 has elapsed (YES in the step S27), the voltage detection section of the operation detection section 60 detects (step S29) the lamp voltage V1a of the discharge lamp 90, and then the control section 40 stores the lamp voltage V1a thus detected in the storage section 44. Subsequently, the control section 40 makes (step S30) an evaluation of the machine learning drive pattern DW1 presently selected.

The evaluation of the machine learning drive pattern DW1 in the step S30 is substantially the same as, for example, the evaluation of the machine learning drive pattern DW1 in the step S17 in the initial learning period. Specifically, the control section 40 makes an evaluation of the machine learning drive pattern DW1 based on a value of the lamp voltage V1a obtained after the machine learning drive pattern DW1 thus selected is executed for the steady learning time, and a difference of the lamp voltage V1a obtained after the machine learning drive pattern DW1 thus selected is executed for the steady learning time from the lamp voltage V1a obtained before executing the machine learning drive pattern DW1 thus selected. In the following description, the difference of the lamp voltage V1a obtained after executing the machine learning drive pattern DW1 for the steady learning time from the lamp voltage V1a obtained before executing the machine learning drive pattern DW1 is called a second variation voltage value.

In the step S30, the control section 40 makes a re-evaluation of the machine learning drive pattern DW1 thus selected in the steady learning period. Specifically, the control section 40 updates the evaluation made in the initial learning period with respect to each of the machine learning drive patterns DW1 and the evaluation made in the steady learning period before the present moment with respect to each of the machine learning drive patterns DW1.

Subsequently, the control section 40 determines (step S31) whether or not the machine learning drive pattern DW1 presently selected fulfills a continuous execution condition. The continuous execution condition includes the fact that any one of a first continuous execution condition, a second continuous execution condition, and a third continuous execution condition is fulfilled. Each of the first continuous execution condition, the second continuous execution condition, and the third continuous execution condition includes the condition that the number of times of the continuous execution is equal to or smaller than a predetermined number of times. The predetermined number of times related to the number of times of the continuous execution is, for example, no smaller than twice and no larger than 15 times.

Further, the first continuous execution condition is that the lamp voltage V1a obtained after executing the machine learning drive pattern DW1 thus selected for the steady learning time is higher than the target numerical value range, and at the same time, the second variation voltage value is a negative value. The second continuous execution condition is that the lamp voltage V1a is included in the target numerical value range before and after the execution of the machine learning drive pattern DW1 thus selected. The third continuous execution condition is that the lamp voltage V1a obtained after executing the machine learning drive pattern DW1 thus selected for the steady learning time is lower than the target numerical value range, and at the same time, the second variation voltage value is a positive value.

In the case in which the present machine learning drive pattern DW1 fulfills the continuous execution condition (YES in the step S31), the control section 40 determines that the machine learning drive pattern DW1 presently selected is a desirable machine learning drive pattern DW1 for extending the life of the discharge lamp 90 in the present state of the discharge lamp 90. Then, the control section 40 selects (step S32) once again the machine learning drive pattern DW1 presently selected as the machine learning drive pattern DW1 to be subsequently executed. Then, the process makes the transition to the step S26, and the control section 40 continuously executes the previous machine learning drive pattern DW1 selected as the machine learning drive pattern DW1 to be executed this time.

As described hereinabove, in the present embodiment, in the case in which the variation of the lamp voltage V1a before and after executing one machine learning drive pattern DW1 thus selected for the steady learning time fulfills the continuous execution condition, the control section 40 executes the same machine learning drive pattern DW1 a plurality of times continuously.

In contrast, in the case in which the present machine learning drive pattern DW1 fails to fulfill the continuous execution condition (NO in the step S31), the control section 40 determines (step S33) whether or not the selection and the execution of the machine learning drive pattern DW1 have been performed a predetermined number of times in the steps S22 through S26.

In the case in which the selection and the execution of the machine learning drive pattern DW1 have not been performed the predetermined number of times (NO in the step S33), the process makes the transition to the step S22 to perform the selection of the machine learning drive pattern DW1 once again. The predetermined number of times related to the selection and the execution of the machine learning drive pattern DW1 in every cycle of the steady learning period is, for example, larger than the number N of the machine learning drive patterns DW1.

In the case in which the selection and the execution of the machine learning drive pattern DW1 have been performed the predetermined number of times (YES in the step S33), the control section 40 terminates (step S34) the cycle of the steady learning period. The control section 40 repeats the cycle described above to continue to execute the steady learning period. The subsequent cycle is executed in the state of taking over the parameters from the previous cycle of the steady learning period except the fact that the number of times of the selection and the execution of the machine learning drive pattern DW1 is reset.

In such a manner as described above, the control section 40 performs the machine learning with the initial learning period and the steady learning period to select the machine learning drive pattern DW1 to be executed. The initial learning period is executed just one time after, for example, the projector 500 is lit for the first time. The steady learning period is always provided during the period in which the projector 500 is in the lighting state after, for example, the initial learning period is terminated. For example, in the case in which the projector 500 is powered OFF, and is then powered ON once again, the control section 40 resumes the period which has been executed last time the power has been switched OFF from the point where the period has been interrupted.

Figure 12A:
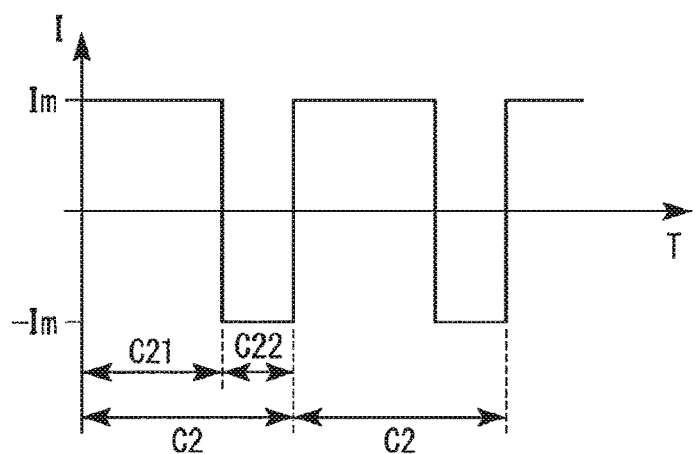
FIG. 12A is a diagram showing an example of a drive current waveform supplied to the discharge lamp in an imbalanced drive operation of the embodiment.
Figure 12B:
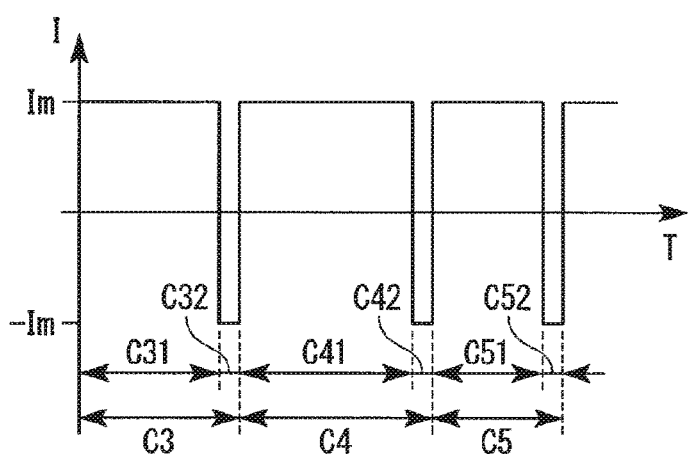
FIG. 12B is a diagram showing an example of the drive current waveform supplied to the discharge lamp in the imbalanced drive operation of the embodiment.
Figure 13:
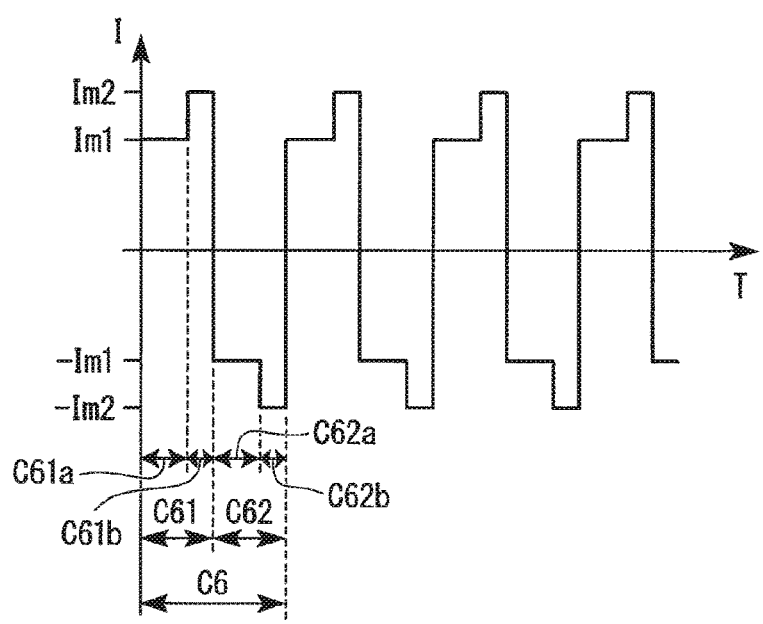
FIG. 13 is a diagram showing an example of a drive current waveform supplied to the discharge lamp in a jumping drive operation of the embodiment.

The drive current waveform of the machine learning drive pattern DW1 is not particularly limited, and can also be a drive current waveform different from the drive current waveform shown in FIG. 9. For example, the drive current waveform of the machine learning drive pattern DW1 can also include the drive current waveforms shown in FIG. 12A, FIG. 12B and FIG. 13. FIG. 12A, FIG. 12B and FIG. 13 are each a diagram showing another example of the drive current waveform supplied to the discharge lamp 90 in the AC drive operation. In FIG. 12A, FIG. 12B and FIG. 13, the vertical axis represents the drive current I, and the horizontal axis represents time T. The drive current I is shown defining the case of the first polarity state as positive, and the case of the second polarity state as negative.

The AC drive operations shown in FIG. 12A and FIG. 12B are each an imbalanced drive operation with the duty ratio smaller than 0.5 (50%). The drive current I supplied to the discharge lamp 90 in each of the imbalanced drive operations shown in FIG. 12A and FIG. 12B is, for example, a rectangular wave AC current having the polarity inverted a plurality of times between the current value Im and the current value −Im.

In the imbalanced drive operation shown in FIG. 12A, the length of the period C2 is constant. In the period C2, there are provided a first polarity period C21 realizing the first polarity state, and a second polarity period C22 realizing the second polarity state. The length of the first polarity period C21 is longer than the length of the second polarity period C22. Specifically, the imbalanced drive operation shown in FIG. 12A has the number of cycles, the length of the period C2, the duty ratio, the length of the first polarity period C21 and the length of the second polarity period C22 as the drive parameters.

In the imbalanced drive operation shown in FIG. 12B, the length of the period varies. In the example shown in FIG. 12B, there are provided a first period C3, a second period C4, and a third period C5. The length of the first period C3 is longer than the length of the third period C5. The length of the second period C4 is longer than the length of the first period C3.

In the first period C3, there are provided a first polarity period C31 realizing the first polarity state, and a second polarity period C32 realizing the second polarity state. The length of the second polarity period C32 is shorter than the length of the first polarity period C31. In the second period C4, there are provided a first polarity period C41 realizing the first polarity state, and a second polarity period C42 realizing the second polarity state. The length of the second polarity period C42 is shorter than the length of the first polarity period C41. In the third period C5, there are provided a first polarity period C51 realizing the first polarity state, and a second polarity period C52 realizing the second polarity state. The length of the second polarity period C52 is shorter than the length of the first polarity period C51.

The length of the first polarity period C31 is longer than the length of the first polarity period C51. The length of the first polarity period C41 is longer than the length of the first polarity period C31. The length of the second polarity period C32, the length of the second polarity period C42, and the length of the second polarity period C52 are the same as each other. The lengths of the first polarity periods C31, C41, and C51 are, for example, no less than 5.0 ms (millisecond) and no more than 20 ms (millisecond). The lengths of the second polarity periods C32, C42, and C52 are shorter than 0.5 ms (millisecond).

Specifically, the imbalanced drive operation shown in FIG. 12B has the number of cycles, the lengths of the respective periods, the duty ratios, the lengths of the first polarity periods and the lengths of the second polarity periods as the drive parameters similarly to the imbalanced drive operation shown in FIG. 12A.

The AC drive operation shown in FIG. 13 is a jumping drive operation in which the absolute value of the drive current I jumps in each of the polarity states. The drive current I supplied to the discharge lamp 90 in the jumping drive operation shown in FIG. 13 is, for example, a rectangular wave AC current having the current value changing between Im1, Im2, −Im1, −Im2. The absolute value of Im2 and −Im2 is larger than the absolute value of Im1 and −Im1. In the jumping drive operation shown in FIG. 13, the length of the period C6 is constant. The duty ratio of the AC current shown in FIG. 13 is 0.5 (50%).

In the period C6, there are provided a first polarity period C61 realizing the first polarity state, and a second polarity period C62 realizing the second polarity state. The length of the first polarity period C61 and the length of the second polarity period C62 are the same as each other. The first polarity period C61 includes a low current period C61a and a high current period C61b. The low current period C61a is a period in which the drive current I is at a current value Im1. The high current period C61b is a period in which the drive current I is at a current value Im2. The length of the high current period C61b is shorter than the length of the low current period C61a.

The second polarity period C62 includes a low current period C62a and a high current period C62b. The low current period C62a is a period in which the drive current I is at a current value −Im1. The high current period C62b is a period in which the drive current I is at a current value −Im2. The length of the high current period C62b is shorter than the length of the low current period C62a. The length of the low current period C61a and the length of the low current period C62a are the same as each other. The length of the high current period C61b and the length of the high current period C62b are the same as each other.

Therefore, the jumping drive operation shown in FIG. 13 has the number of cycles, the length of the period C6, the absolute value of the current values Im1 and −Im1, the absolute value of the current values Im2 and −Im2, the length of the first polarity period C61, the length of the second polarity period C62, the length of the low current period C61a and the length of the high current period C61b in the first polarity period C61, the length of the low current period C62a and the length of the high current period C62b in the second polarity period C62, the proportion of the low current period C61a or the high current period C61b in the first polarity period C61, the proportion of the low current period C62a or the high current period C62b in the second polarity period C62, the ratio of the absolute value of the current values Im2 and −Im2 to the absolute value of the current values Im1 and −Im1, and so on as the drive parameters.

It should be noted that in the above description, the drive operations shown in FIG. 12A, FIG. 12B, and FIG. 13 are described as examples of the AC drive operation, but the AC drive operation is not limited to these examples. For example, it is also possible to assume the drive operations shown in FIG. 12A, FIG. 12B, and FIG. 13 as examples of the DC drive operation. In this case, the polarity of the DC drive operation and the length of the execution time of the DC drive operation arbitrarily change to thereby form the drive current waveforms shown in the drawings.

Then, the non-machine learning control NMLC by the control section 40 will be described. In the non-machine learning control NMCL, the control section 40 executes a non-machine learning drive pattern DW2 as the predetermined drive pattern DW out of the predetermined drive patterns DW. The control section 40 switches between the machine learning control MLC and the non-machine learning control NMLC based on a predetermined condition. In the case in which the predetermined condition is fulfilled, the control section 40 executes the non-machine learning drive pattern DW2 without selecting and executing the machine learning drive pattern DW1 based on the machine learning. In the present embodiment, there is disposed a plurality of non-machine learning drive patterns DW2.

Firstly, first voltage increase control VIC1 and second voltage increase control VIC2 included in the non-machine learning control NMLC will be described. In the first voltage increase control VIC1, a first voltage increase pattern DWV1 included in the non-machine learning drive pattern DW2 is executed. The first voltage increase pattern DWV1 is configured including a third AC drive operation AC3. The period during which the third AC drive operation AC3 is performed is a low-frequency period during which an AC current is supplied to the discharge lamp 90. In the present embodiment, the first voltage increase pattern DWV1 is composed only of, for example, the third AC drive operation AC3.

The drive current waveform supplied to the discharge lamp 90 in the third AC drive operation AC3 is substantially the same as the drive current waveform supplied to the discharge lamp 90 in the first AC drive operation AC1 and the second AC drive operation AC2. In the third AC drive operation AC3, the AC current having a third frequency f3 which is a frequency lower than the first frequency f1 of the AC current and the second frequency f2 of the AC current respectively supplied to the discharge lamp 90 in the first AC drive operation AC1 and the second AC drive operation AC2 is supplied to the discharge lamp 90. The value of the third frequency f3 is, for example, no lower than 30 Hz and no higher than 200 Hz. In the third AC drive operation AC3, the value of the third frequency f3 varies to a plurality of values. Specifically, the low-frequency period has a plurality of AC periods different in the third frequency f3 of the AC current supplied to the discharge lamp 90 from each other. The low-frequency period has, for example, two AC periods, namely a first AC period P1 and a second AC period P2. Therefore, in this case, the low-frequency period has the first AC period P1 and the second AC period P2, and the third frequency f3 of the AC current supplied to the discharge lamp 90 in the first AC period P1 and the third frequency f3 of the AC current supplied to the discharge lamp 90 in the second AC period P2 are different from each other.

Figure 14:
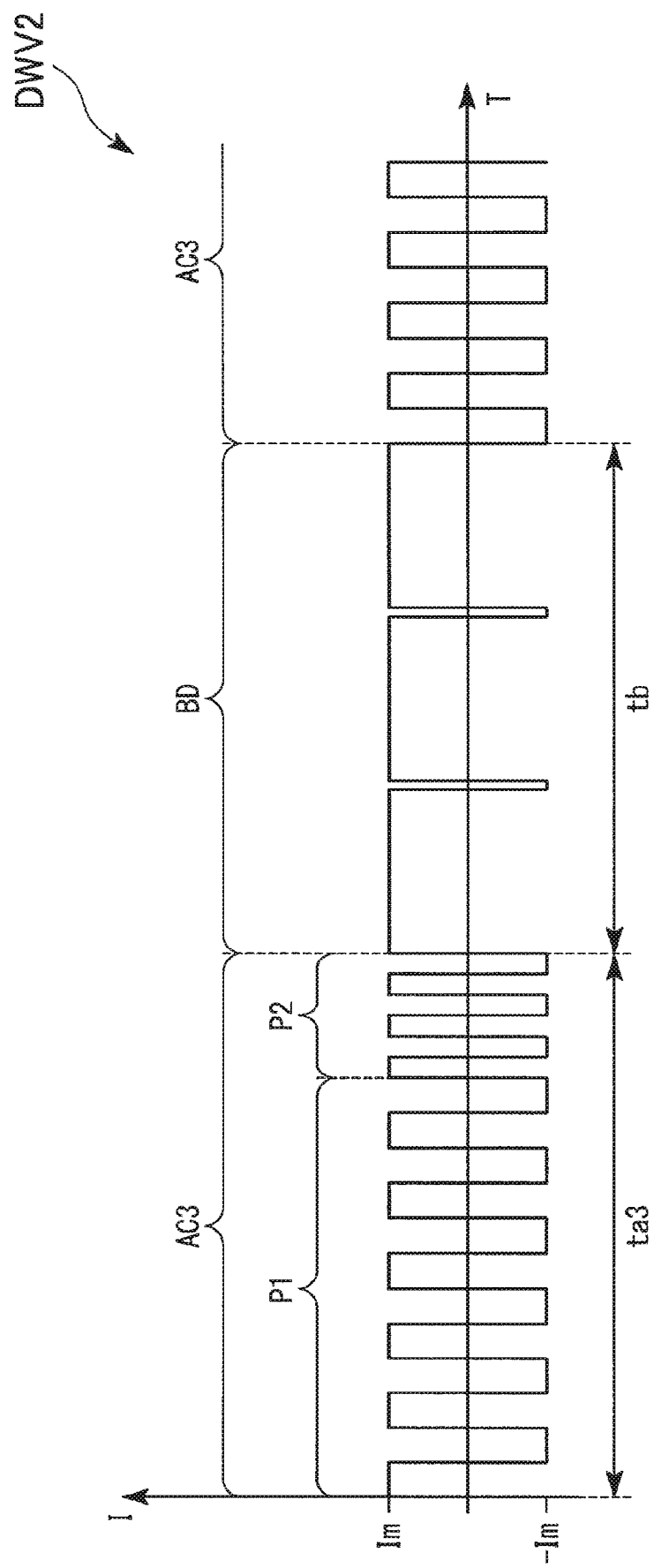
FIG. 14 is a schematic diagram showing an example of a second voltage increase pattern of a drive current supplied to the discharge lamp in the embodiment.

In the second voltage increase control VIC2, a second voltage increase pattern DWV2 included in the non-machine learning drive pattern DW2 is executed. FIG. 14 is a diagram showing an example of the second voltage increase pattern DWV2 of the drive current I supplied to the discharge lamp 90 in the present embodiment. In FIG. 14, the vertical axis represents the drive current I, and the horizontal axis represents time T. As shown in FIG. 14, the second voltage increase pattern DWV2 is composed of the third AC drive operation AC3 and the imbalanced drive operation BD. The period during which the imbalanced drive operation BD is performed corresponds to a third period. In the second voltage increase pattern DWV2 of the present embodiment, for example, the third AC drive operation AC3 and the imbalanced drive operation BD are performed alternately. Further, in the second voltage increase pattern DWV2 of the present embodiment, for example, the first polarity in the first polarity period (a first DC period) and the second polarity in the second polarity period (a second DC period) are inverted every time the third period is provided. Therefore, in the third period provided subsequently to the third period shown in FIG. 14, the length of each of the second polarity periods is longer than the length of each of the first polarity periods. As described above, in the present embodiment, in the case in which the predetermined condition described later is fulfilled, the control section 40 executes the second voltage increase pattern DWV2 including the low-frequency period and the third period.

The drive current waveform of the current supplied to the discharge lamp 90 in the imbalanced drive operation BD is substantially the same as the drive current waveform of the current supplied to the discharge lamp 90 in the imbalanced drive operation shown in FIG. 12B. In the imbalanced drive operation BD, for example, the first polarity periods are equal in length to each other. Each of the intervals (the intervals at which the third periods are provided) at which the imbalanced drive operations BD are performed, namely the execution time (the length ta3 of one low-frequency period) of the third AC drive operation AC3, is about, for example, no less than 10 s (seconds) and no more than 90 s (seconds). Further, in the second voltage increase pattern DWV2, the execution time (the length tb of the third period) of the imbalanced drive operation BD is about, for example, no less than 10 ms (milliseconds) and no more than 1000 ms (milliseconds).

Figure 15:
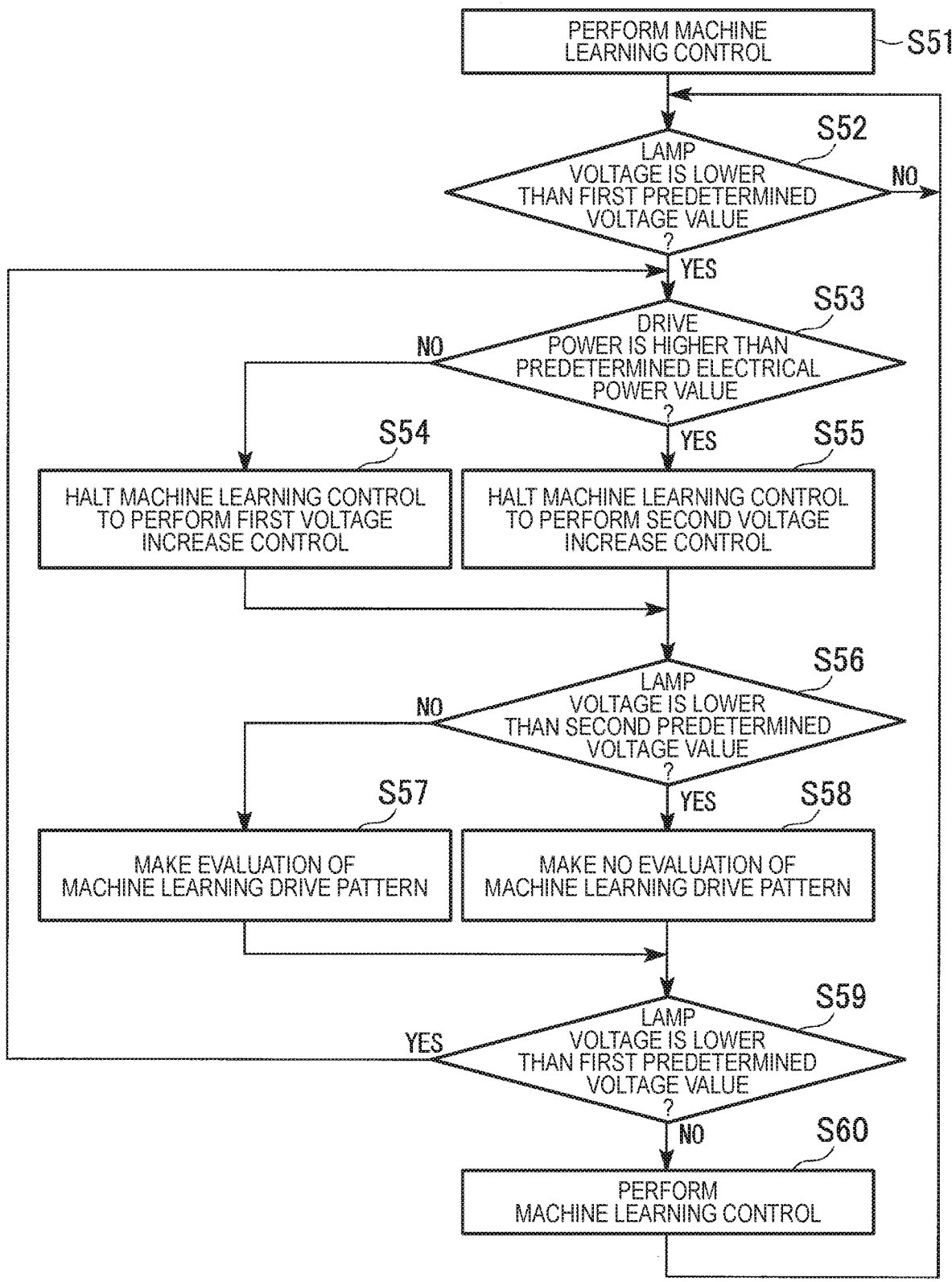
FIG. 15 is a flowchart showing an example of a control procedure of the control section in switching between the machine learning control, and first voltage increase control and second voltage increase control of the embodiment.

In the present embodiment, the control section 40 switches between the machine learning control MLC, and the first voltage increase control VIC1 and the second voltage increase control VIC2 based on the lamp voltage V1a and the drive power Wd. FIG. 15 is a flowchart showing an example of a control procedure of the control section 40 in switching between the machine learning control MLC, and the first voltage increase control VIC1 and the second voltage increase control VIC2.

As shown in FIG. 15, the control section 40 performs (step S51) the machine learning control MLC. Then, the voltage detection section of the operation detection section 60 detects the lamp voltage V1a of the discharge lamp 90. Then, while performing the machine learning control MLC, the control section 40 determines (step S52) whether or not the lamp voltage V1a thus detected is lower than a first predetermined voltage value. The first predetermined voltage value is, for example, a median value of the target numerical value range described above. Specifically, in the case in which the target numerical value range is no lower than 60 V and lower than 65 V, the first predetermined voltage value is, for example, 63 V. Further, in the case in which the target numerical value range is no lower than 53 V and lower than 59 V, the first predetermined voltage value is, for example, 56 V.

In the case in which the lamp voltage V1a is equal to or higher than the first predetermined voltage value (NO in the step S52), the control section 40 continuously performs the machine learning control MLC. In contrast, in the case in which the lamp voltage V1a is lower than the first predetermined voltage value (YES in the step S52), the control section 40 determines (step S53) whether or not the drive power Wd is higher than a predetermined electrical power value. The predetermined electrical power value is, for example, lower than the rated electrical power. The predetermined electrical power value is, for example, roughly 80 percent of the rated electrical power.

In the case in which the drive power Wd is equal to or lower than the predetermined electrical power value (NO in the step S53), the control section 40 halts the machine learning control MLC to perform (step S54) the first voltage increase control VIC1. In other words, the control section 40 switches from the machine learning control MLC to the first voltage increase control VIC1. In contrast, in the case in which the drive power Wd is higher than the predetermined electrical power value (YES in the step S53), the control section 40 halts the machine learning control MLC to perform (step S55) the second voltage increase control VIC2. In other words, the control section 40 switches from the machine learning control MLC to the second voltage increase control VIC2. Thus, the control section 40 executes the first voltage increase pattern DWV1 or the second voltage increase pattern DWV2. In this case, the control section 40 forcibly terminates the execution of the machine learning drive pattern DW1 to execute the first voltage increase pattern DWV1 or the second voltage increase pattern DWV2 irrespective of the flowchart of the machine learning control MLC described above.

As described above, in the case in which the lamp voltage V1a is lower than the first predetermined voltage value, the control section 40 performs the first voltage increase control VIC1 or the second voltage increase control VIC2. In other words, in the case in which the lamp voltage V1a is lower than the first predetermined voltage value, the control section 40 executes the drive pattern DW including the low-frequency period as the predetermined drive pattern DW. As described above, in the present embodiment, the predetermined condition for the non-machine learning control NMLC to be performed includes the fact that the lamp voltage V1a is lower than the first predetermined voltage value.

Further, in the case in which the lamp voltage V1a is lower than the first predetermined voltage value, and the drive power Wd is higher than the predetermined electrical power value, the control section 40 performs the second voltage increase control VIC2. In other words, in the case in which the lamp voltage V1a is lower than the first predetermined voltage value, and the drive power Wd is higher than the predetermined electrical power value, the control section 40 executes the drive pattern DW including the low-frequency period and the third period as the predetermined drive pattern DW. As described above, in the present embodiment, the predetermined condition for the non-machine learning control NMLC to be performed includes the fact that the lamp voltage V1a is lower than the first predetermined voltage value, and the drive power Wd is higher than the predetermined electrical power value.

After starting to perform the first voltage increase control VIC1 or the second voltage increase control VIC2, the voltage detection section of the operation detection section 60 detects the lamp voltage V1a of the discharge lamp 90. Then, while performing the first voltage increase control VIC1 or the second voltage increase control VIC2, the control section 40 determines (step S56) whether or not the lamp voltage V1a thus detected is lower than a second predetermined voltage value. The second predetermined voltage value is lower than the first predetermined voltage value. The second predetermined voltage value is, for example, the lowest value of the target numerical value range. In this case, in the step S56, the control section 40 determines whether or not the lamp voltage V1a is lower than the target numerical value range. In the case in which the target numerical value range is no lower than 60 V and lower than 65 V, the second predetermined voltage value is, for example, 60 V. Further, in the case in which the target numerical value range is no lower than 53 V and lower than 59 V, the second predetermined voltage value is, for example, 53 V.

In the case in which the lamp voltage V1a is equal to or higher than the second predetermined voltage value (NO in the step S56), the control section 40 makes (step S57) an evaluation of the machine learning drive pattern DW1 selected and executed in the machine learning control MLC described above while performing the first voltage increase control VIC1 or the second voltage increase control VIC2. Specifically, the control section 40 makes an evaluation of the machine learning drive pattern DW1 having been executed immediately before switching from the machine learning control MLC to the first voltage increase control VIC1 or the second voltage increase control VIC2. In contrast, in the case in which the lamp voltage V1a is lower than the second predetermined voltage value (YES in the step S56), the control section 40 does not make (step S58) the evaluation of the machine learning drive pattern DW1 having been selected and executed in the machine learning control MLC.

Subsequently, the voltage detection section of the operation detection section 60 detects the lamp voltage V1a of the discharge lamp 90. Then, while performing the first voltage increase control VIC1 or the second voltage increase control VIC2, the control section 40 determines (step S59) once again whether or not the lamp voltage V1a thus detected is lower than the first predetermined voltage value. In the case in which the lamp voltage V1a is lower than the first predetermined voltage value (YES in the step S59), the process makes the transition to the step S53, and the control section 40 determines whether or not the drive power Wd is higher than the predetermined electrical power value, and then performs the first voltage increase control VIC1 or the second voltage increase control VIC2 in accordance with the result of the determination. Specifically, the control section 40 continues to perform the first voltage increase control VIC1 or the second voltage increase control VIC2, and in the case in which the drive power Wd changes so as to cross the predetermined electrical power value, the control section 40 switches between the first voltage increase control VIC1 and the second voltage increase control VIC2. In contrast, in the case in which the lamp voltage V1a is equal to or higher than the first predetermined voltage value (NO in the step S59), the control section 40 performs (step S60) the machine learning control MLC once again.

Table 1 shows an example of the switching between the control operations and presence or absence of the evaluation of the machine learning drive pattern DW1 in the variation of the lamp voltage V1a described hereinabove. In Table 1, the predetermined electrical power value is 140 W. The first predetermined voltage value is 56 V. The second predetermined voltage value is 53 V.

TABLE 1

| DRIVE POWER Wd [W] | LAMP VOLTAGE V1a [V] | | PRESENCE/ABSENCE OF EVALUATION | TYPE OF CONTROL |
|---|---|---|---|---|
| 140 | | V1a ≥ 59 | PRESENT | MACHINE LEARNING CONTROL MLC |
| | TARGET NUMERICAL VALUE RANGE | 59 > V1a ≥ 56 | PRESENT | |
| | | 56 > V1a ≥ 53 | PRESENT | FIRST VOLTAGE INCREASE CONTROL VIC1 |
| | | 53 > V1a | ABSENT | |
| HIGHER THAN 140 | | V1a ≥ 59 | PRESENT | MACHINE LEARNING CONTROL MLC |
| | TARGET NUMERICAL VALUE RANGE | 59 > V1a ≥ 56 | PRESENT | |
| | | 56 > V1a ≥ 53 | PRESENT | SECOND VOLTAGE INCREASE CONTROL VIC2 |
| | | 53 > V1a | ABSENT | |

It should be noted that, for example, since the first predetermined voltage value varies in accordance with the value of the drive power Wd, it is also possible for the control section 40 to judge the value of the drive power Wd in accordance with the value of the first predetermined voltage value determined in the step S52 and the step S59 to determine which one of the first voltage increase control VIC1 and the second voltage increase control VIC2 is to be performed.

Then, the flicker suppression control FRC included in the non-machine learning control NMLC will be described. In the flicker suppression control FRC, a flicker suppression pattern (a second drive pattern) DWF included in the non-machine learning drive pattern DW2 is executed. The flicker suppression pattern DWF has substantially the same drive current waveform as that of the machine learning drive pattern DW1. Therefore, the flicker suppression pattern DWF includes a mixed period.

The length of the first period in the flicker suppression pattern DWF is longer than the first period in the machine learning drive pattern DW1 executed in the machine learning control MLC. The length of the first period in the flicker suppression pattern DWF is, for example, equal to or longer than 0.1 s (second).

The first frequency f1 and the second frequency f2 in the first period in the flicker suppression pattern DWF are higher than the first frequency f1 and the second frequency in the first period in the machine learning drive pattern DW1. The first frequency f1 and the second frequency f2 in the flicker suppression pattern DWF are, for example, equal to or higher than 400 Hz.

The length of the second period in the flicker suppression pattern DWF is shorter than the second period in the machine learning drive pattern DW1. The length of the second period in the flicker suppression pattern DWF is, for example, equal to or shorter than 50 ms (milliseconds).

Further, it is also possible for the machine learning drive pattern DW1 and the flicker suppression pattern DWF to include the third period in addition to the mixed period. In this case, the length of the third period in the flicker suppression pattern DWF is shorter than the third period in the machine learning drive pattern DW1. The length of the third period in the flicker suppression pattern DWF is, for example, 0 s (second). In other words, the expression that the length of the third period in the flicker suppression pattern DWF is shorter than the length of the third period in the machine learning drive pattern DW1 includes the fact that the flicker suppression pattern DWF does not have the third period.

In the present embodiment, the flicker suppression pattern DWF is a drive pattern DW different from any of the machine learning drive patterns DW1 executed in the machine learning control MLC. It should be noted that it is also possible for some of the drive parameters of the flicker suppression pattern DWF to be the same as those of the drive parameters of any one of the machine learning drive patterns DW1.

Figure 16:
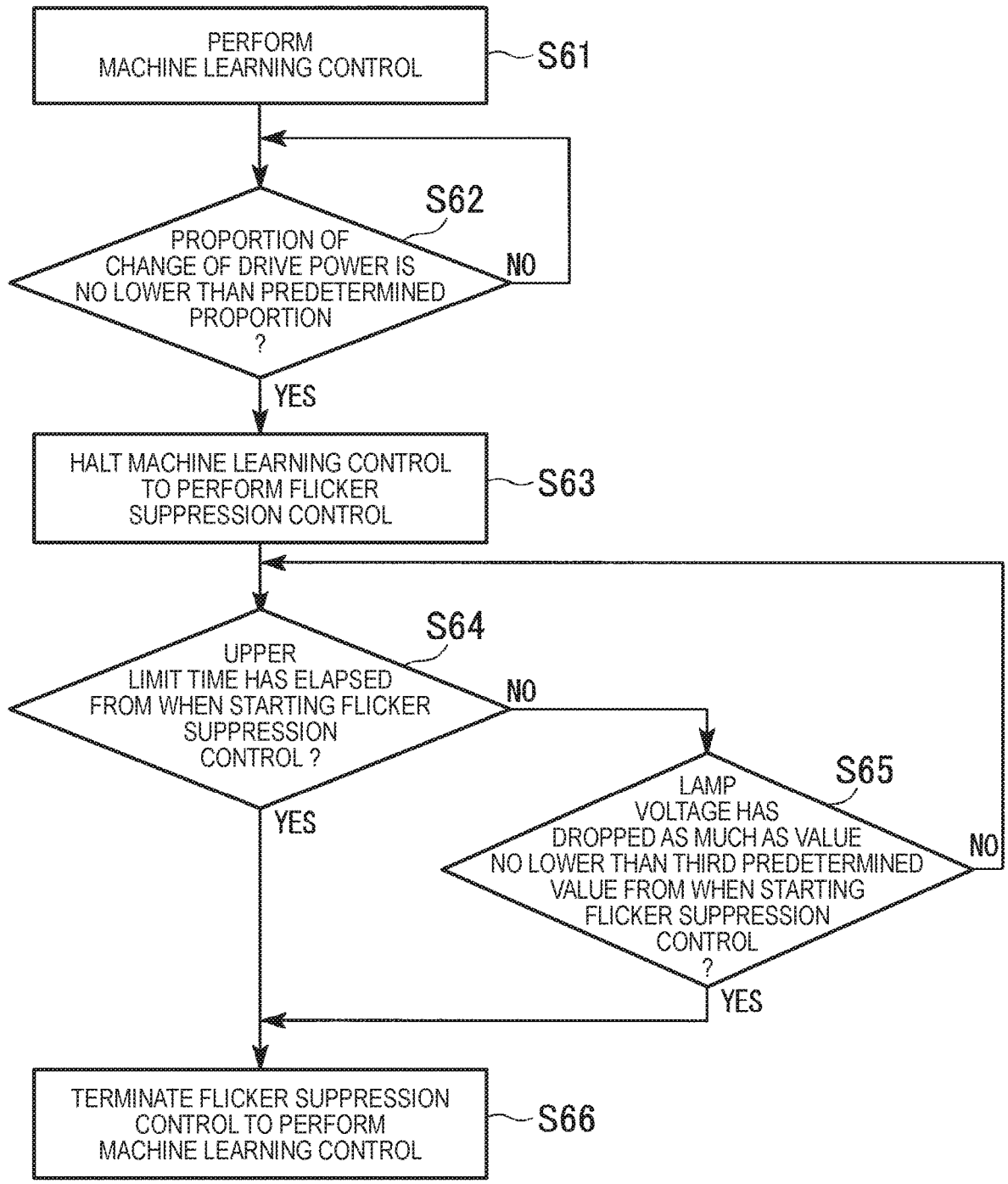
FIG. 16 is a flowchart showing an example of a control procedure of the control section in switching between the machine learning control and a flicker suppression control of the embodiment.
Figure 17:
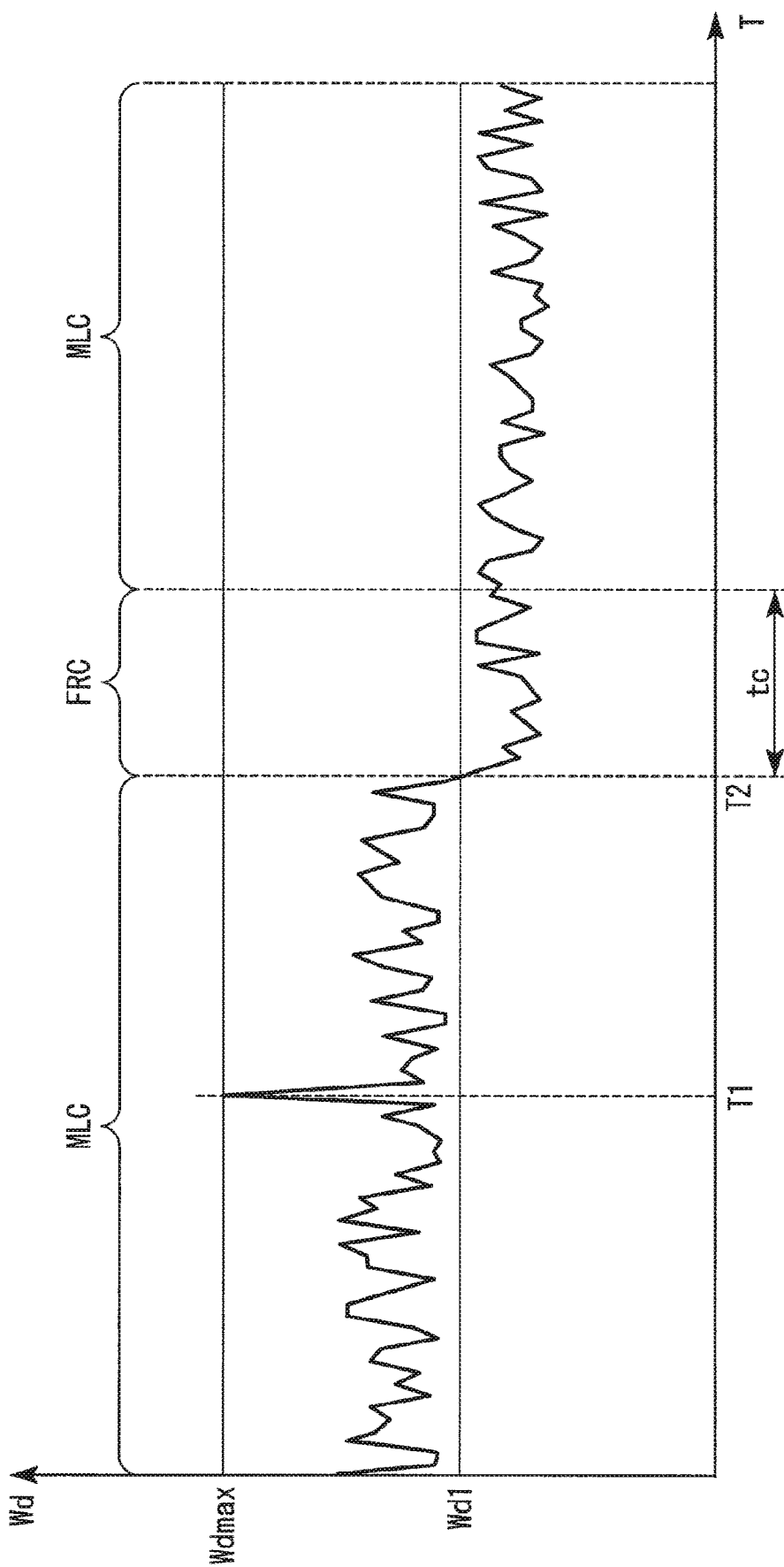
FIG. 17 is a graph showing an example of a change in drive power and switching of the control in the embodiment.

In the present embodiment, the control section 40 switches between the machine learning control MLC and the flicker suppression control FRC based on a change in the drive power Wd. FIG. 16 is a flowchart showing an example of a control procedure of the control section 40 in switching between the machine learning control MLC and the flicker suppression control FRC. FIG. 17 is a graph showing an example of a change in the drive power Wd and switching of the control. In FIG. 17, the vertical axis represents the drive power Wd, and the horizontal axis represents time T.

As shown in FIG. 16, the control section 40 performs (step S61) the machine learning control MLC, and determines (step S62) whether or not the proportion of the change in the drive power Wd is equal to or larger than a predetermined proportion while performing the machine learning control MLC. The expression that the proportion of the change of the drive power Wd is equal to or larger than the predetermined proportion means that the proportion of the change amount of the drive power Wd to the drive power Wd before the change occurs is equal to or larger than a predetermined value in the case in which the drive power Wd has changed. The predetermined proportion is, for example, 10%. In this case, if the drive power Wd before the change occurs is 230 W, the proportion of the change of the drive power Wd becomes equal to or larger than the predetermined proportion in the case in which the change amount of the drive power Wd is equal to or larger than 23 W or equal to or smaller than −23 W.

In the present embodiment, the change amount of the drive power Wd is determined as a change amount from the maximum value of the drive power Wd within a given time period. The given time period is, for example, 2 h (hours). Specifically, for example, in the case in which the drive power Wd takes the maximum value Wdmax in the given time period at the time T1 shown in FIG. 17, the time T2 at which the drive power Wd takes a value Wd1 of the drive power Wd changing as much as the predetermined proportion from the maximum value Wdmax is the time at which the proportion of the change of the drive power Wd becomes equal to or larger than the predetermined proportion. In the example shown in FIG. 17, there is shown the case in which the drive power Wd lowers from the maximum value Wdmax as much as the predetermined proportion to take the value Wd1.

As shown in FIG. 16, in the case in which the proportion of the change of the drive power Wd is smaller than the predetermined proportion (NO in the step S62), the control section 40 continues to perform the machine learning control MLC. In contrast, in the case in which the proportion of the change of the drive power Wd is equal to or larger than the predetermined proportion (YES in the step S62), the control section 40 halts the machine learning control MLC to perform (step S63) the flicker suppression control FRC. In other words, the control section 40 switches from the machine learning control MLC to the flicker suppression control FRC. Thus, the control section 40 executes the flicker suppression pattern DWF. In this case, the control section 40 forcibly terminates the execution of the machine learning drive pattern DW1 to execute the flicker suppression pattern DWF irrespective of the flowchart of the machine learning control MLC described above.

After starting the flicker suppression control FRC, the control section 40 determines (step S64) whether or not upper limit time has elapsed from when starting the flicker suppression control FRC. The upper limit time is, for example, no less than 5 min (minutes) and no more than 2 h (hours). It should be noted that the upper limit time can also be shorter than 5 min (minutes). In the case in which the upper limit time has elapsed (YES in the step S64), the control section 40 terminates the flicker suppression control FRC to perform (step S66) the machine learning control MLC. In other words, the control section 40 switches from the flicker suppression control FRC to the machine learning control MLC. In this case, the length of the execution time tc of the flicker suppression control FRC is the same as the length of the upper limit time.

As described above, in the case in which the proportion of the change of the drive power Wd is equal to or larger than the predetermined proportion, the control section 40 executes the flicker suppression pattern (the second drive pattern) DWF different from the machine learning drive pattern DW1 (the first drive pattern) for the upper limit time. As described above, in the present embodiment, the predetermined condition for the non-machine learning control NMLC to be performed includes the fact that the proportion of the change of the drive power Wd is equal to or larger than the predetermined proportion.

In the case in which the upper limit time has not elapsed (NO in the step S64), the voltage detection section of the operation detection section 60 detects the lamp voltage V1a of the discharge lamp 90. Then, the control section 40 determines (step S65) whether or not the lamp voltage V1a thus detected has lowered as much as a value equal to or larger than a third predetermined value (a predetermined value) from when starting the flicker suppression control FRC. The third predetermined value is, for example, 3 V. In the case in which the lamp voltage V1$a$ has not dropped as much as a value equal to or larger than the third predetermined value from when starting the flicker suppression control FRC (NO in the step S65), the control section 40 continuously performs the flicker suppression control FRC.

In contrast, in the case in which the lamp voltage V1$a$ has dropped as much as a value equal to or larger than the third predetermined value from when starting the flicker suppression control FRC (YES in the step S65), the control section 40 terminates the flicker suppression control FRC to perform (step S66) the machine learning control MLC. Therefore, even in the case in which the upper limit time has not elapsed yet from when starting the flicker suppression control FRC, the flicker suppression pattern DWF is terminated in the case in which the lamp voltage V1$a$ has dropped as much as a value equal to or larger than third predetermined value. As described above, in the present embodiment, in the case in which the lamp voltage V1$a$ has dropped as much as a value equal to or larger than the third predetermined value after starting the execution of the flicker suppression pattern DWF, the control section 40 terminates the execution of the flicker suppression pattern DWF, and performs the selection and the execution of the machine learning drive pattern DW1 based on the machine learning. In this case, the length of the execution time tc of the flicker suppression control FRC is shorter than the length of the upper limit time.

As described hereinabove, in the present embodiment, the control section 40 switches from the flicker suppression pattern DWF to the machine learning drive pattern DW1 based on the machine learning based on the length of the execution time of the flicker suppression pattern DWF or the lamp voltage V1$a$.

Then, the high-load drive control HLC included in the non-machine learning control NMLC will be described. In the high-load drive control HLC, a high-load drive pattern DWH included in the non-machine learning drive pattern DW2 is executed. The high-load drive pattern DWH is a drive pattern DW higher in thermal load applied to the first electrode 92 and the second electrode 93 than the machine learning drive pattern DW1. The high-load drive pattern DWH is not particularly limited providing the thermal load applied to the first electrode 92 and the second electrode 93 is higher than that of the machine learning drive pattern DW1. The high-load drive pattern DWH can be, for example, a drive pattern DW obtained by modulating the drive current waveform of the machine learning drive pattern DW1 so as to have a higher duty ratio, or a drive pattern DW having the drive power Wd higher than the drive power Wd when performing the machine learning control MLC.

Figure 18:
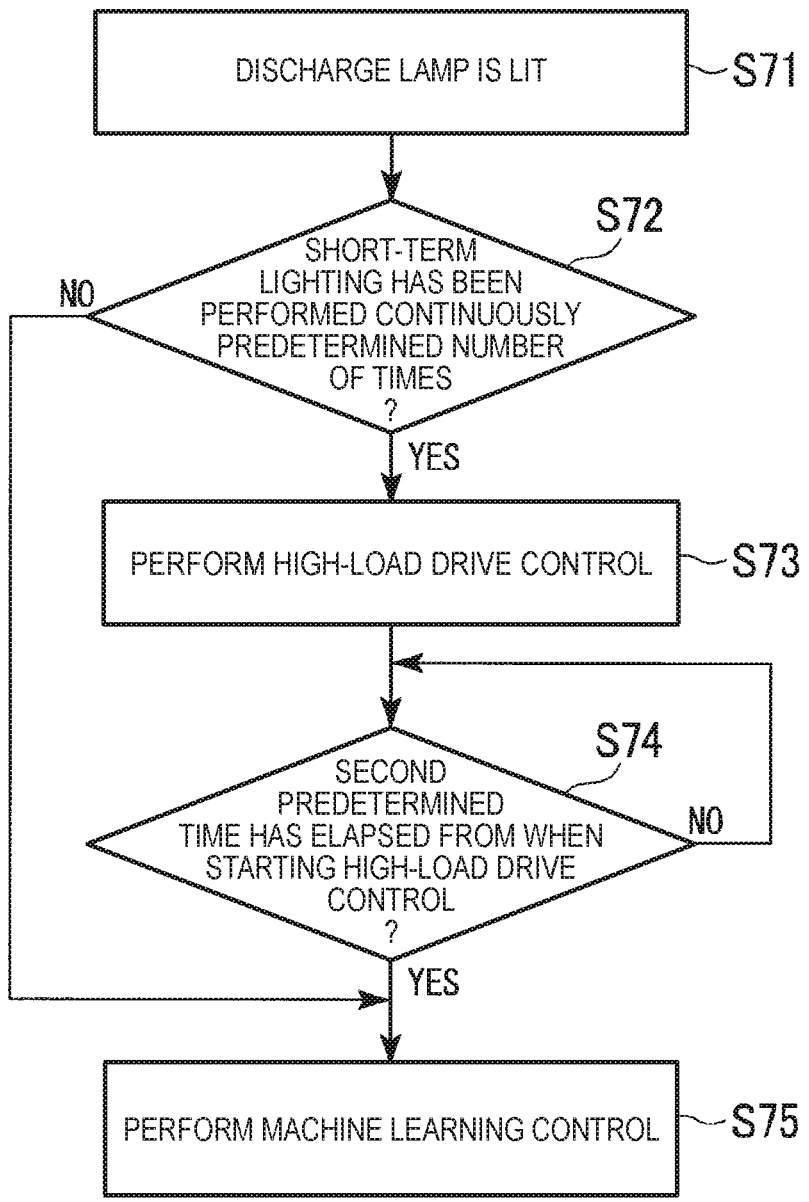
FIG. 18 is a flowchart showing an example of a control procedure of the control section in switching between the machine learning control and a high-load drive control of the embodiment.
Figure 19:
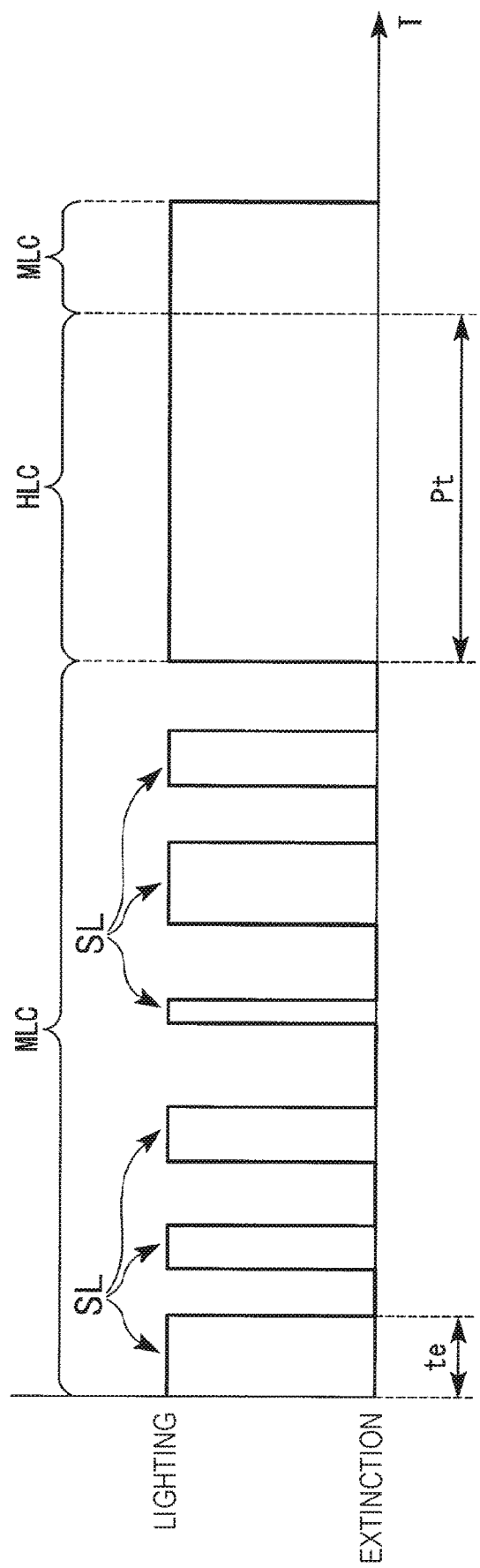
FIG. 19 is a graph showing an example of switching of execution and control between lighting and extinction of the discharge lamp of the embodiment.

In the present embodiment, the control section 40 switches between the machine learning control MLC and the high-load drive control HLC based on a history of the execution of lighting and extinction of the discharge lamp 90. FIG. 18 is a flowchart showing an example of a control procedure of the control section 40 in switching between the machine learning control MLC and the high-load drive control HLC. FIG. 19 is a graph showing an example of switching of the execution and the control between lighting and extinction of the discharge lamp 90. In FIG. 19, the vertical axis represents lighting and extinction of the discharge lamp 90, and the horizontal axis represents time T.

As shown in FIG. 18, after the discharge lamp 90 is lit (step S71), the control section 40 determines (step S72) whether or not short-term lighting SL has been performed a predetermined number of times continuously. In other words, the control section 40 determines whether or not the number of continuous executions of the short-term lighting SL is equal to or larger than a predetermined number of times. The short-term lighting SL is a lighting operation in which a single lighting period to of the discharge lamp 90 is equal to or shorter than first predetermined time. The first predetermined time is, for example, 10 min (minutes). The predetermined number of times is, for example, 6.

In the case in which the short-term lighting SL has not been performed continuously the predetermined number of times (NO in the step S72), the control section 40 performs (step S75) the machine learning control MLC. In contrast, in the case in which the short-term lighting SL has been performed continuously the predetermined number of times (YES in the step S72), the control section 40 performs (step S73) the high-load drive control HLC. Thus, the high-load drive pattern DWH is executed.

After starting the high-load drive control HLC, the control section 40 determines (step S74) whether or not a second predetermined time Pt has elapsed from when starting the high-load drive control HLC. The second predetermined time Pt is, for example, equal to or longer than 10 min (minutes). In the case in which the second predetermined time Pt has not elapsed (NO in the step S74), the control section 40 continuously performs the high-load drive control HLC. In contrast, in the case in which the second predetermined time Pt has elapsed (YES in the step S74), the control section 40 terminates the high-load drive control HLC to perform (step S75) the machine learning control MLC. In other words, the control section 40 switches from the high-load drive control HLC to the machine learning control MLC.

As described above, in the present embodiment, in the case in which the short-term lighting SL has been performed continuously the predetermined number of times, the control section 40 executes the high-load drive pattern DWH higher in the thermal load applied to the first electrode 92 and the second electrode 93 than the machine learning drive pattern DW1 for the second predetermined time Pt. As described above, in the present embodiment, the predetermined condition for the non-machine learning control NMLC to be performed includes the fact that the short-term lighting SL has been performed continuously the predetermined number of times.

Then, the compulsory input control CIC included in the non-machine learning control NMLC will be described. The compulsory input control CIC is the control performed in response to the input section 45 receiving the operation. In the present embodiment, the input section 45 is configured to receive an execution input of the flicker suppression pattern DWF and a switching input of the drive patterns DW. Specifically, in the present embodiment, the predetermined condition for the non-machine learning control NMLC to be performed includes the fact that the input section 45 has received the execution input of the flicker suppression pattern DWF, and the fact that the input section 45 has received the switching input of the drive patterns DW.

In the case in which the input section 45 has received the execution input of the flicker suppression pattern DWF, the control section 40 switches from the drive pattern DW presently executed to the flicker suppression pattern DWF. After switching to the flicker suppression pattern DWF, the control section 40 performs substantially the same control as the flicker suppression control FRC described above. The switching of the drive pattern DW in the case in which the input section 45 has received the execution input of the flicker suppression pattern DWF is performed even in the process in which, for example, the control section 40 is performing any of the control operations described above.

In the case in which the input section 45 has received the switching input of the drive pattern DW, the control section 40 switches from the drive pattern DW presently executed to another drive pattern DW. In the present embodiment, switching to another drive pattern DW in the case in which the input section 45 has received the switching input of the drive pattern DW is performed in the process of, for example, performing the machine learning control MLC. In the case in which the input section 45 has received the switching input of the drive pattern DW while performing the machine learning control MLC, the control section 40 selects the subsequent machine learning drive pattern DW1 in the same manner as in the case of performing the machine learning control MLC, and then forcibly switches to the machine learning drive pattern DW1. Therefore, the non-machine learning drive pattern DW2 executed in the compulsory input control CIC includes substantially the same drive pattern DW as the machine learning drive pattern DW1.

The control section 40 does not execute the drive pattern DW having been executed immediately before the switching for a given period of time from the switching of the drive pattern DW based on the input received by the input section 45 in such a manner as described above. For example, in the case in which the drive pattern DW has been switched based on the input having been received by the input section 45 in the machine learning control MLC, the machine learning drive pattern DW1 having been executed when the user has performed the input operation on the input section 45 is not executed for the given period of time. Specifically, for example, by lowering the rating of the machine learning drive pattern DW1 executed when the user has performed the input operation on the input section 45 to roughly the same level as that of the process in the case in which the drive pattern DW presently selected fulfills the switching condition in the step S28 described above, the control section 40 prevents the machine learning drive pattern DW1 selected and executed before the switching from being selected and executed for a given period of time in the machine learning control MLC.

The discharge lamp lighting device 10 provided with the control section 40 for performing the control described above can also be expressed as a discharge lamp drive method. Specifically, the discharge lamp drive method according to one aspect of the present embodiment is a discharge lamp drive method of supplying the drive current I to the discharge lamp 90 having the first electrode 92 and the second electrode 93 to thereby drive the discharge lamp 90, and is characterized by selecting any one of the drive patterns DW based on the machine learning, then executing the drive pattern DW thus selected, and in the case in which the predetermined condition is fulfilled, executing the predetermined drive pattern DW out of the plurality of drive patterns DW without selecting and executing the drive pattern DW based on the machine learning.

For example, in the related art, since the drive pattern DW corresponding to the value of the lamp voltage $V1a$ and the value of the drive power Wd is set in advance, in the case in which the lamp voltage $V1a$ and the drive power Wd have the same values, the drive pattern DW to be executed is the unique drive pattern DW set in advance.

In contrast, in the present embodiment, since the machine learning drive pattern DW1 is selected due to the machine learning, in the case in which, for example, the lamp voltage $V1a$ is at a predetermined voltage value, and the drive power Wd is at a predetermined electrical power value, a plurality of machine learning drive patterns DW1 different in at least one of the drive parameters from each other is executed. Specifically, in the case in which, for example, the drive power Wd supplied to the control section 40 and the discharge lamp 90 is in a predetermined power band, and the lamp voltage $V1a$ of the discharge lamp 90 has a predetermined voltage value, at least three machine learning drive patterns DW1 are executed. The at least three machine learning drive patterns DW1 are the machine learning drive patterns DW1 different from each other in the value of at least one of the drive parameters in the drive operation constituting one machine learning drive pattern DW1. In other words, in the case of detecting the machine learning drive patterns DW1 of the drive current I supplied to the discharge lamp 90 setting the lamp voltage $V1a$ constant and setting the power band of the drive power Wd constant, it is possible to detect at least three or more machine learning drive patterns DW1 different from each other. It should be noted that the predetermined power band means, for example, a numerical value range of the drive power Wd having a width no larger than about 10 W.

Further, if the selection and the execution of the machine learning drive pattern DW1 are executed using the machine learning as described above, in the case in which the lamp voltage $V1a$ of the discharge lamp 90 has a predetermined voltage value, the machine learning drive pattern DW1 to be selected and executed differs depending on to the differences in accumulated lighting time of the discharge lamp 90 or the individual characteristics of the discharge lamp 90. Specifically, in the case in which the lamp voltage $V1a$ of the discharge lamp 90 is at the predetermined voltage value, the control section 40 executes at least two machine learning drive patterns DW1, for example, the third drive pattern and the fourth drive pattern, in accordance with at least one of the accumulated lighting time of the discharge lamp 90 and the individual characteristics of the discharge lamp 90.

The third drive pattern and the fourth drive pattern are any two of the machine learning drive patterns DW1. The third drive pattern and the fourth drive pattern are different from each other in the value of at least one of the drive parameters in the drive operations constituting each of the drive patterns. It should be noted that the accumulated lighting time is the total sum of the time for which the discharge lamp 90 has been lit. In other words, the accumulated lighting time is the lighting time of the discharge lamp 90 accumulated from when the discharge lamp 90 has been lit for the first time.

Specifically, for example, the control section 40 executes the third drive pattern in the case in which the lamp voltage $V1a$ has a predetermined voltage value and the accumulated lighting time is a first accumulated lighting time, or executes the fourth drive pattern in the case in which the lamp voltage $V1a$ has the predetermined voltage value and the accumulated lighting time is a second accumulated lighting time different from the first accumulated lighting time. In other words, in the case of detecting the machine learning drive patterns DW1 of the drive current I supplied to the discharge lamp 90 setting the lamp voltage $V1a$ constant, if the accumulated lighting time of the discharge lamp 90 varies, it is possible to detect at least two or more machine learning drive patterns DW1 different from each other.

Further, for example, the control section 40 executes the third drive pattern in the case in which the lamp voltage $V1a$ has the predetermined voltage value and the discharge lamp 90 is a first individual lamp, or executes the fourth drive pattern in the case in which the lamp voltage V1$a$ has the predetermined voltage value and the discharge lamp 90 is a second individual lamp different from the first individual lamp. In other words, in the case of detecting the machine learning drive patterns DW1 of the drive current I supplied to the discharge lamp 90 setting the lamp voltage V1$a$ constant, if the individual discharge lamp 90 changes, it is possible to detect at least two or more machine learning drive patterns DW1 different from each other.

It should be noted that the fact that the drive patterns are different in the value of at least one of the drive parameters from each other includes the case in which, for example, the drive operation constituting the machine learning drive pattern DW1 is different between the two machine learning drive patterns DW1. More specifically, also in the case in which, for example, the third drive pattern is constituted by the AC drive operation, the fourth drive pattern is constituted by the DC drive operation and the AC drive operation, and the drive parameters related to the AC drive operation in the third drive pattern and the drive parameters related to the AC drive operation in the fourth drive pattern are the same, the third drive pattern and the fourth drive pattern are regarded as the machine learning drive patterns DW1 different in at least one of the drive parameters from each other. In this case, since the DC drive operation is not included in the third drive pattern, the drive parameters related to the DC drive operation in the third drive pattern are regarded as zero. Thus, in this case, the third drive pattern and the fourth drive pattern are different from each other in the drive parameters related to the DC drive operation.

According to the present embodiment, in such a manner as described above, the control section 40 selects any one of the machine learning drive patterns DW1 based on the machine learning, and then executes the machine learning drive pattern DW1 thus selected. Therefore, by performing the machine learning, even in the case in which the individual difference exists between the discharge lamps 90, it is possible to select the preferable machine learning drive pattern DW1 in accordance with the individual difference between the discharge lamps 90. Therefore, according to the present embodiment, it is possible to extend the life of the discharge lamp 90 irrespective of the individual difference between the discharge lamps 90.

Further, if the drive power Wd supplied to the discharge lamp 90 changes, the melting state and the growth state of the projection 552$p$ of the first electrode 92 change. Therefore, in the past, it was necessary to determine the preferable drive patterns of the drive current I to be supplied to the discharge lamp 90 in accordance with the lamp voltage V1$a$ and store the preferable drive patterns DW to the storage section 44 for each of the values of the drive power Wd to be supplied to the discharge lamp 90. Therefore, it was difficult to set the drive patterns DW corresponding to the lamp voltage V1$a$ for each of the values of the drive power Wd, and there was adopted a specification in which the drive power Wd supplied to the discharge lamp 90 could only be changed to a few predetermined levels of the drive power Wd.

In contrast, according to the present embodiment, since the machine learning drive pattern DW1 is selected based on the machine learning, even in the case in which the drive power Wd is changed, the preferable machine learning drive pattern DW1 can be selected in accordance with the change in the drive power Wd. Thus, it becomes possible to easily change the drive power Wd to be supplied to the discharge lamp 90 in multiple levels. Therefore, for example, it becomes possible for the user to arbitrarily change the drive power Wd to change the luminance of the picture projected from the projector 500 at will. Therefore, it becomes also possible to extend the life of the discharge lamp 90 while setting the drive power Wd relatively low to preferably reduce the power consumption of the projector 500.

Further, since it becomes possible to arbitrarily change the drive power Wd, it becomes possible to use the drive power Wd as one of the drive parameters of the machine learning drive pattern DW1 to be changed when extending the life of the discharge lamp 90. Thus, it is possible to further extend the life of the discharge lamp 90. For example, it is also possible to provide an operation section for changing the drive power Wd on the housing of the projector 500.

Further, according to the present embodiment, the control section 40 performs the selection of the machine learning drive pattern DW1 based on the change in the lamp voltage V1$a$. Therefore, by detecting the lamp voltage V1$a$, it is possible to perform the selection of the machine learning drive pattern DW1, and it is possible to preferably and easily perform the machine learning.

Further, according to the present embodiment, in the case in which the variation of the lamp voltage V1$a$ thus detected fulfills the switching condition when executing the machine learning drive pattern DW1 thus selected, the control section 40 switches from the machine learning drive pattern DW1 thus selected to another machine learning drive pattern DW1. Therefore, in the case in which the machine learning drive pattern DW1 thus selected is an undesirable machine learning drive pattern DW1 for extending the life with respect to the state of the discharge lamp 90 at that moment, it is possible to switch the machine learning drive pattern DW1 to another desirable machine learning drive pattern DW1. Therefore, it is possible to prevent the life of the discharge lamp 90 from being shortened.

Further, as described above, the machine learning drive pattern DW1 having fulfilled the switching condition is degraded in rating, and is determined not to fulfill the execution condition when the machine learning drive pattern DW1 having fulfilled the switching condition is subsequently selected in the step S24 and then whether or not the machine learning drive pattern DW1 having fulfilled the switching condition fulfills the execution condition is determined in the step S25. In other words, the control section 40 does not execute the machine learning drive pattern DW1 having fulfilled the switching condition for a predetermined period. Therefore, according to the present embodiment, it is possible to prevent the machine learning drive pattern DW1 having a high possibility of shortening the life of the discharge lamp 90 from being executed, and thus, the life of the discharge lamp 90 can further be extended.

As described above, in the case in which the steady learning time has elapsed from when starting the execution of the machine learning drive pattern DW1 thus selected, the control section 40 selects the next machine learning drive pattern DW1. Therefore, the length of the execution time (the predetermined time) of the machine learning drive pattern DW1 basically becomes equal to the length of the steady learning time. However, since the machine learning drive pattern DW1 selected in the steady learning period is switched to another machine learning drive pattern DW1 in some cases halfway before the steady learning time elapses depending on the state of the discharge lamp 90, the execution time (the predetermined time) of one machine learning drive pattern DW1 thus selected, namely a period from when starting the execution of the one machine learning drive pattern DW1 to when the one machine learning drive pattern DW1 is switched to the next machine learning drive pattern DW1, changes in some cases even in the same machine learning drive pattern DW1.

In other words, the control section 40 changes the length of the execution time (the predetermined time) in which the predetermined machine learning drive pattern DW1 out of the plurality of machine learning drive patterns DW1 is executed based on the lamp voltage V1a. Therefore, it is possible to arbitrarily switch between the machine learning drive patterns DW1 in accordance with the change in the lamp voltage V1a, and thus, it is possible to further extend the life of the discharge lamp 90.

Further, the length of the execution time in which a predetermined one of the drive patterns DW1 is executed changes in such a manner as described above, and therefore changes in accordance with the accumulated lighting time of the discharge lamp 90. Further, the length of the execution time in which the predetermined drive pattern out of the plurality of machine learning drive patterns DW1 is executed changes in such a manner as described above, and therefore changes in accordance with the individual characteristics of the discharge lamp 90. In the case in which the machine learning drive pattern DW1 selected has been switched halfway to another machine learning drive pattern DW1, the execution time (the predetermined time) of the machine learning drive pattern DW1 thus selected is shorter than the steady learning time.

Further, in the case of, for example, always executing the same machine learning drive pattern DW1 even if the machine learning drive pattern DW1 has the highest rating, namely the machine learning drive pattern DW1 makes the lamp voltage V1a of the discharge lamp 90 the closest to the target numerical value range, it becomes difficult for the projection 552p of the first electrode 92 to grow in some cases, and it becomes difficult to sufficiently extend the life of the discharge lamp 90 in some cases. Further, for example, the melting state of the projection 552p of the first electrode 92 of the discharge lamp 90 changes with the deterioration of the discharge lamp 90, namely an increase in the accumulated lighting time. Therefore, even the machine learning drive pattern DW1 preferable for extending the life of the discharge lamp 90 at a certain time point becomes the machine learning drive pattern DW1 undesirable for extending the life of the discharge lamp 90 at another time point in some cases.

In contrast, according to the present embodiment, the control section 40 selects and executes one of the machine learning drive patterns DW1 not having been selected from the N machine learning drive patterns DW1 and the machine learning drive pattern DW1 having a relatively high rating in one cycle of the steady learning period. Therefore, in one cycle, both of the machine learning drive pattern DW1 having a relatively high rating including the machine learning drive pattern DW1 having the highest rating and the other machine learning drive pattern DW1 are executed. Specifically, the control section 40 of the present embodiment executes both of the machine learning drive pattern DW1 (hereinafter referred to as a high-rating drive pattern DWm) having a relatively high rating including the machine learning drive pattern DW1 having the highest rating of the plurality of machine learning drive patterns DW1, and the machine learning drive pattern DW1 (hereinafter referred to as another drive pattern DWe) having a rating lower than the rating of the high-rating drive pattern DWm out of the plurality of the machine learning drive patterns DW1 in a certain period. Thus, it is possible to execute the other drive pattern DWe having a rating lower than the rating of the high-rating drive pattern DWm having a high rating between the high-rating drive pattern DWm, and it is easy to dramatically vary a stimulus of a thermal load applied to the first electrode 92. Therefore, it is easy to grow the projection 552p, and thus, it is easy to further extend the life of the discharge lamp 90.

Further, according to the present embodiment, in the case in which the variation of the lamp voltage V1a before and after executing the machine learning drive pattern DW1 selected fulfills the continuous execution condition, the control section 40 executes that machine learning drive pattern DW1 a plurality of times continuously. Here, in the present embodiment, there is adopted the configuration in which a plurality of machine learning drive patterns DW1 different in at least one of the drive parameters from each other is executed in the case in which the lamp voltage V1a is at a predetermined voltage value, and the drive power Wd is at a predetermined power value. In other words, the present embodiment has a random nature that one of two or more machine learning drive patterns DW1 is selected and executed in one condition on the one hand, and also has a nature that the same drive pattern is to be continuously executed in the case in which the machine learning drive pattern DW1 selected fulfills the continuous execution condition on the other hand. Therefore, it is possible to continuously execute the machine learning drive pattern DW1 preferable for extending the life of the discharge lamp 90 a plurality of times, and it is easy to further extend the life of the discharge lamp 90. Further, in the present embodiment, the continuous execution condition includes the fact that the number of continuous execution times is no larger than a predetermined number of times. Therefore, it is possible to continuously execute the preferable machine learning drive pattern DW1 the plurality of times in such execution time that the state of the discharge lamp 90 does not dramatically change. Therefore, it is easy to further extend the life of the discharge lamp 90.

Further, according to the present embodiment, the control section 40 performs the determination on whether or not the machine learning drive pattern DW1 fulfills the execution condition as shown in the step S25, and does not execute the machine learning drive pattern DW1 in the case in which the machine learning drive pattern DW1 does not fulfill the execution condition. Thus, it is difficult for the machine learning drive pattern DW1 having a relatively low rating to be executed. Therefore, it is easy to further extend the life of the discharge lamp 90.

Since the machine learning drive pattern DW1 is selected and then executed based on such machine learning as described above, in the present embodiment, the probability that the machine learning drive pattern DW1 is executed is different between the machine learning drive patterns DW1 irrespective of the lamp voltage V1a. Specifically, in the case in which the lamp voltage V1a of the discharge lamp 90 is at a predetermined voltage value, the probability that the third drive pattern is executed and the probability that the fourth drive pattern is executed are different from each other.

Further, in the execution period in which the third drive pattern and the fourth drive pattern are each executed at least one or more times, the proportion of the execution time in which the third drive pattern is executed to the length of the execution period and the proportion of the execution time in which the fourth drive pattern is executed to the length of the execution period are different from each other. The execution period corresponds to, for example, one cycle of the steady learning period.

Further, in the execution period in which the third drive pattern and the fourth drive pattern are each executed at least one or more times, namely one cycle of the steady learning period, for example, the number of times of the execution of the third drive pattern and the number of times of the execution of the fourth drive pattern are different from each other. In the case of defining the third drive pattern as the high-rating drive pattern DWm including the machine learning drive pattern DW1 having the highest rating, and the fourth drive pattern as one machine learning drive pattern DW1 of other drive patterns DWe, the number of times of the execution of the third drive pattern is larger than the number of times of the execution of the fourth drive pattern.

Further, for example, if the number (N) of the machine learning drive patterns DW1 to be selected is too small, the preferable machine learning drive pattern DW1 corresponding to the state of the discharge lamp 90 fails to be included in some cases. In contrast, if the number of the machine learning drive patterns DW1 is too large, it takes time to execute the initial learning period, and it takes time until the preferable machine learning drive pattern DW1 is selected. Further, in the steady learning period, the proportion of executing the drive pattern other than the preferable machine learning drive pattern DW1 becomes large.

In contrast, if the number of the machine learning drive patterns DW1 is made no less than 10 and no more than 100, it is possible to make it easy to select the preferable machine learning drive pattern DW1 corresponding to the state of the discharge lamp 90, and to shorten the length of the initial learning period. Further, since the proportion of the preferable machine learning drive pattern DW1 can be made large in the steady learning period, the life of the discharge lamp 90 can further be extended. Further, if the number of the machine learning drive patterns DW1 is made no smaller than 20 and no larger than 30, these advantages can be obtained in an enhanced manner.

As described above, by using the machine learning, it is possible to preferably select the machine learning drive pattern DW1 to be executed, and it is possible to extend the life of the discharge lamp 90. However, there can be assumed the case in which there occurs a problem from a viewpoint other than the life of the discharge lamp 90 only by using the machine learning alone. Therefore, in the case of using the machine learning alone, although the life of the discharge lamp 90 can be extended, the convenience and the amenity of the user using the equipment such as the projector 500 equipped with the discharge lamp 90 degrade in some cases although the life of the discharge lamp 90 can be extended.

In contrast, according to the present embodiment, in the case in which the predetermined condition is fulfilled, the non-machine learning drive pattern DW2 is executed as the predetermined drive pattern DW without selecting and executing the machine learning drive pattern DW1 based on the machine learning. Therefore, separately from the machine learning control MLC based on the machine learning, it is possible to select and execute the suitable drive pattern DW for each of individual problems irrespective of the machine learning. Thus, according to the present embodiment, it is possible to enhance the convenience and the amenity of the user while extending the life of the discharge lamp 90 based on the machine learning.

Specifically, as the case in which a problem occurs from a viewpoint other than the life of the discharge lamp 90, there can be cited the case in which a mercury bridge occurs. For example, in the discharge lamp 90 in a comparatively-early state, the projections $552p$, $562p$ of the first electrode 92 and the second electrode 93 grow too much, and thus, the inter-electrode distance becomes relatively short in some cases. In this case, after turning off the discharge lamp 90, there occurs, in some cases, the mercury bridge formed of liquefied mercury adhering so as to straddle the first electrode 92 and the second electrode 93 in the discharge lamp 90. If the mercury bridge occurs, since the first electrode 92 and the second electrode 93 are shorted to each other, the discharge lamp 90 becomes unable to light.

In order to prevent such a mercury bridge from occurring, it is conceivable to execute such a drive pattern DW as to increase the inter-electrode distance. However, in general, such a drive pattern DW is apt to shorten the life of the discharge lamp 90. Therefore, it is preferable not to include such a drive pattern DW as to increase the inter-electrode distance in the machine learning drive patterns DW1 to be selected in the machine learning control MLC. However, according to the above, there is a problem that it is difficult to prevent the mercury bridge even if the machine learning control MLC is performed.

In contrast, according to the present embodiment, in the case in which the lamp voltage V1$a$ is lower than the first predetermined voltage value, the control section 40 executes the first voltage increase pattern DWV1 or the second voltage increase pattern DWV2 each including the low-frequency period as the predetermined drive pattern DW. Therefore, in the case in which the lamp voltage V1$a$ becomes relatively low, namely in the case in which the projections $552p$, $562p$ grow too much, and thus, the inter-electrode distance becomes relatively short, it is possible to execute the first voltage increase pattern DWV1 or the second voltage increase pattern DWV2 irrespective of the machine learning.

In the low-frequency period, the AC current having the third frequency f3 lower than the first frequency f1 and the second frequency f2 of the AC current supplied to the discharge lamp 90 in the first period is supplied to the discharge lamp 90. Therefore, when executing the drive pattern DW including the low-frequency period, it is easy to melt and shorten the projections $552p$, $562p$ of the first electrode 92 and the second electrode 93, and it is possible to increase the inter-electrode distance between the first electrode 92 and the second electrode 93. Therefore, by executing the first voltage increase pattern DWV1 or the second voltage increase pattern DWV2, it is possible to prevent the mercury bridge from occurring. Thus, according to the present embodiment, it is possible to prevent the mercury bridge from occurring to enhance the convenience of the user while extending the life of the discharge lamp 90.

Further, for example, in the case of executing the first voltage increase pattern DWV1 composed only of the low-frequency period, in the case in which the drive power Wd is relatively low, although the thermal load applied to the first electrode 92 and the second electrode 93 is relatively high, the portions of the first electrode 92 and the second electrode 93 which can be melted before the polarity is switched are relatively small, and it is difficult for the projections $552p$, $562p$ to grow. Therefore, it is possible to shorten the projections $552p$, $562p$. In contrast, in the case in which the drive power Wd is relatively high, the thermal load to be applied to the first electrode 92 and the second electrode 93 becomes preferably high, and the portions of the first electrode 92 and the second electrode 93 which can be melted before the polarity is switched become relatively large. Thus, if the first voltage increase pattern DWV1 is executed in the case in which the drive power Wd is relatively high, the projections $552p$, $562p$ grow in some cases. Therefore, it is difficult to prevent the mercury bridge from occurring in some cases.

In contrast, according to the present embodiment, in the case in which the lamp voltage V1a is lower than the first predetermined voltage value, and the drive power Wd supplied to the discharge lamp 90 is equal to or higher than the predetermined electrical power value, the second voltage increase pattern DWV2 including the low-frequency period and the third period is executed as the predetermined drive pattern DW. In the third period, the thermal load applied to the first electrode 92 and the second electrode 93 is higher than in the low-frequency period. Therefore, if the third period is executed in the case in which the drive power Wd is equal to or higher than the predetermined electrical power value, namely in the case in which the drive power Wd is relatively high, it is possible to make the thermal load to be applied to the first electrode 92 and the second electrode 93 excessively high to crush the projections 552p, 562p. Thus, it is possible to preferably shorten the projections 552p, 562p having grown too much to prevent the mercury bridge from occurring.

Further, for example, if the second voltage increase pattern DWV2 is executed in the case in which the drive power Wd is lower than the predetermined electrical power value, namely in the case in which the drive power Wd is relatively low, the thermal load to be applied to the first electrode 92 and the second electrode 93 preferably increases. Therefore, it is difficult to prevent that the projections 552p, 562p grow to cause the mercury bridge in some cases. Therefore, by appropriately executing the first voltage increase pattern DWV1 and the second voltage increase pattern DWV2 in accordance with the drive power Wd as described above, it is possible to more preferably shorten the projections 552p, 562p to further prevent the mercury bridge from occurring.

Further, for example, even in the case of shortening the projections 552p, 562p using the first voltage increase pattern DWV1 or the second voltage increase pattern DWV2, if the projections 552p, 562p are excessively crushed, it is difficult to grow the projections 552p, 562p when performing the machine learning control MLC once again in some cases.

In contrast, according to the present embodiment, the low-frequency period has a plurality of AC periods different in frequency of the AC current supplied to the discharge lamp 90 from each other. Thus, in the case of executing the first voltage increase pattern DWV1 or the second voltage increase pattern DWV2, it is possible to appropriately apply the stimulus by the change of the thermal load to the first electrode 92 and the second electrode 93, and it is possible to shorten the projections 552p, 562p while forming bases on which the projections 552p, 562p easily grow. Therefore, it is possible to make it easy to grow the projections 552p, 562p when restoring the machine learning control MLC while shortening the projections 552p, 562p to prevent the mercury bridge.

Further, as the case in which a problem occurs from a viewpoint other than the life of the discharge lamp 90, there can be cited the case in which flickers occur. For example, if the drive power Wd rapidly increases, the thermal load applied to the first electrode 92 and the second electrode 93 are apt to become too high with respect to the thickness of the projections 552p, 562p formed by the relatively low drive power Wd before the increase. Therefore, the projections 552p, 562p are melted to disappear in some cases. Therefore, the luminescent point of the arc discharge migrates on each of the surface of the first electrode 92 and the surface of the second electrode 93 in some cases. If the luminescent points migrate, the inter-electrode distance varies to vary the level of the arc discharge, and therefore, the illuminance of the discharge lamp 90 varies to cause the flickers in some cases.

Further, for example, if the drive power Wd rapidly decreases, the size of the luminescent points of the arc discharge are apt to become small with respect to the thickness of the projections 552p, 562p formed by the relatively high drive power Wd before the decrease. Therefore, it is easy for the luminescent points to migrate on the projections 552p, 562p. Therefore, the flickers occur in some cases.

In contrast, according to the present embodiment, the predetermined condition for the predetermined drive pattern DW to be executed without selecting and executing the machine learning drive pattern DW1 based on the machine learning includes the fact that the proportion of the change of the drive power Wd is equal to or higher than the predetermined proportion. Therefore, in the case in which the drive power Wd has changed rapidly, it is possible to execute the predetermined drive pattern DW capable of preferably suppressing the flickers, namely the flicker suppression pattern DWF in the embodiment described above. Therefore, it is possible to prevent the flickers from occurring in the discharge lamp 90, and it is possible to prevent the image projected from the projector 500 from flickering. As a result, the amenity of the user can be enhanced.

Specifically, according to the present embodiment, the length of the first period in the flicker suppression pattern DWF is longer than the first period in the machine learning drive pattern DW1 executed in the machine learning control MLC. Further, the first frequency f1 and the second frequency f2 in the first period in the flicker suppression pattern DWF are higher than the first frequency and the second frequency in the first period in the machine learning drive pattern DW1 executed in the machine learning control MLC. Therefore, it is possible to shorten the time during which the polarity is kept constant, and it is possible to melt/solidify only a part of each of the first electrode 92 and the second electrode 93 to thereby grow the first electrode 92 and the second electrode 93 while stabling the positions of the luminescent points of the arc discharge. Thus, it is possible to promptly form the elongated small projections. Since the small projections are formed, the luminescent points of the arc discharge are stabilized at the tip positions of the small projections. Therefore, the luminescent points of the arc discharge are prevented from migrating. Therefore, according to the present embodiment, it is possible to prevent the flickers from occurring in the case in which the drive power Wd varies rapidly.

Further, according to the present embodiment, the length of the second period in the flicker suppression pattern DWF is shorter than the second period in the machine learning drive pattern DW1 executed in the machine learning control MLC. Therefore, it is possible to appropriately reduce the thermal load to be applied to the first electrode 92 and the second electrode 93 to thereby narrow the area to be melted in each of the first electrode 92 and the second electrode 93. Thus, it is easy to promptly form the small projections. Therefore, it is possible to more preferably suppress the flickers of the discharge lamp 90.

Further, according to the present embodiment, the length of the third period in the flicker suppression pattern DWF is shorter than the third period in the machine learning drive pattern DW1 executed in the machine learning control MLC. Therefore, it is possible to more appropriately reduce the thermal load to be applied to the first electrode 92 and the second electrode 93 to thereby narrow the area to be melted in each of the first electrode 92 and the second electrode 93. Thus, it is easy to promptly form the small projections. Therefore, it is possible to more preferably suppress the flickers of the discharge lamp 90.

Further, since the machine learning is not performed while the flicker suppression pattern DWF is executed, the shorter the execution time of the flicker suppression pattern DWF is the better. In contrast, according to the present embodiment, the control section 40 terminates and then performs the selection and the execution of the machine learning drive pattern DW1 based on the machine learning based on the time during which the flicker suppression pattern DWF is executed or the lamp voltage V1$a$. Therefore, it is possible to prevent the execution time of the flicker suppression pattern DWF from elongating. Thus, it is possible to increase the proportion of the time during which the machine learning is performed to further extend the life of the discharge lamp 90.

Further, according to the present embodiment, in the case in which the lamp voltage V1$a$ has dropped as much as a value equal to or larger than the third predetermined value after starting the execution of the flicker suppression pattern DWF, the control section 40 terminates the execution of the flicker suppression pattern DWF, and performs the selection and the execution of the machine learning drive pattern DW1 based on the machine learning. In the case in which the lamp voltage V1$a$ drops to some extent due to the execution of the flicker suppression pattern DWF, it is possible to determine that the small projections described above are formed. Therefore, even if the flicker suppression pattern DWF is terminated in the case in which the lamp voltage V1$a$ has dropped as much as a value equal to or larger than the third predetermined value, since the small projections are formed, it is possible to suppress the flickers. Therefore, it is easy to further suppress the flickers while shortening the execution time of the flicker suppression pattern DWF to further extend the life of the discharge lamp 90.

Further, according to the present embodiment, in the case in which the input section 45 has received the execution input of the flicker suppression pattern DWF, the control section 40 switches from the drive pattern DW presently executed to the flicker suppression pattern DWF. Therefore, for example, in the case in which the user using the projector 500 has felt flickering in the image projected, by the user performing the predetermined input operation on the input section 45, it is possible to execute the flicker suppression pattern DWF. Thus, in the case in which the flickers occur, it is possible for the user to resolve or reduce the flickers by performing the input to the input section 45. Therefore, it is possible to enhance the convenience and the amenity of the user.

Further, according to the present embodiment, in the case in which the input section 45 has received the switching input of the drive pattern DW, the control section 40 switches from the drive pattern DW presently executed to another drive pattern DW. Therefore, for example, in the case in which the user using the projector 500 has felt flickering in the image projected, by the user performing the predetermined input operation on the input section 45, it is possible to execute another drive pattern DW. Thus, in the case in which the flickers occur, it is possible for the user to forcibly switch from the drive pattern DW causing the flickers to easily resolve or reduce the flickers by performing the input to the input section 45. Therefore, it is possible to enhance the convenience and the amenity of the user. Further, for example, in the case in which the machine learning drive pattern DW1 having been selected and executed in the machine learning control MLC is the machine learning drive pattern DW1 causing the flickers, it is possible to forcibly perform the selection and the execution of the subsequent machine learning drive pattern DW1.

Further, according to the present embodiment, the control section 40 does not execute the drive pattern DW having been executed immediately before the switching for a given period of time from the switching of the drive pattern DW based on the input received by the input section 45. Since there is a high possibility that the drive pattern DW having been executed immediately before the switching is the drive pattern DW having caused the flickers, by preventing that drive pattern DW from being executed for a given period of time, it is possible to further prevent the flickers from occurring.

Further, for example, if the short-term lighting SL with short lighting time of the discharge lamp 90 is performed continuously, the lighting start-up operation of the discharge lamp 90 is performed a plurality of times in a period in which the machine learning drive pattern DW1 is executed once or a small number of times, and the projections 552$p$, 562$p$ are deformed in some cases. In such cases, the flickers are apt to occur. However, in the process of executing the machine learning drive pattern DW1 once or a small number of times, it is difficult, in some cases, to deal with the deformation of the projections 552$p$, 562$p$ caused in an unexpected fashion by continuously performing the short-term lighting SL. Therefore, it is unachievable to suppress the flickers by the machine learning alone, and the amenity of the user degrades in some cases.

In contrast, according to the present embodiment, in the case in which the short-term lighting SL has been performed continuously the predetermined number of times, the control section 40 executes the high-load drive pattern DWH higher in the thermal load applied to the first electrode 92 and the second electrode 93 than the machine learning drive pattern DW1 performed in the machine learning control MLC for the second predetermined time. Therefore, it is possible to melt the projections 552$p$, 562$p$ having been deformed by the continuous short-term lighting SL with the relatively high thermal load and then reform the projections 552$p$, 562$p$. Thus, it is easy to resolve the deformation of the projections 552$p$, 562$p$, and it is possible to prevent the flickers from occurring.

It should be noted that in the present embodiment, it is also possible to adopt the configurations and methods described below.

As long as the control section 40 selects and then executes the machine learning drive pattern DW1 based on the machine learning, the method of the machine learning is not particularly limited. The evaluation method of the machine learning drive pattern DW1 described above is not particularly limited. The initial learning time and the steady learning time can also be different from each other.

Further, it is possible for the control section 40 to switch the machine learning drive pattern DW1 to the machine learning drive pattern DW1 executed last time in the case in which the lamp voltage V1$a$ has dropped as much as a value equal to or larger than a fourth predetermined value in the machine learning control MLC. More specifically, for example, in the case in which selected one of the machine learning drive patterns DW1 is executed, the control section 40 determines whether or not the lamp voltage V1$a$ drops as much as a value equal to or larger than the fourth predetermined value based on the lamp voltage V1$a$ having been detected within the steady learning time, and performs the switching to the machine learning drive pattern DW1 executed last time in the case in which the lamp voltage V1a has dropped as much as a value equal to or larger than the fourth predetermined value. According to this configuration, for example, in the case in which the projection 552p moves, and the lamp voltage V1a drops rapidly, it is possible to perform switching to the machine learning drive pattern DW1 executed before the projection 552p moves. Thus, it is easy to correct the position of the projection 552p to the position before moving. Further, it is possible for the control section 40 to switch the machine learning drive pattern DW1 to the machine learning drive pattern DW1 different from the machine learning drive pattern DW1 executed last time in the case in which the lamp voltage V1a has dropped as much as a value equal to or larger than the fourth predetermined value.

Further, it is also possible for the control section 40 to change the length of the steady learning time based on the lamp voltage V1a in the machine learning control MLC. For example, if the discharge lamp 90 deteriorates, the time until the change in the lamp voltage V1a due to the machine learning drive pattern DW1 occurs becomes long in some cases. In such a case, if the execution time of the machine learning drive pattern DW1 is short, the machine learning drive pattern DW1 cannot appropriately be evaluated in some cases. To cope with the above, by changing the length of the steady learning time based on the lamp voltage V1a, it is possible to elongate the steady learning time to elongate the execution time of the machine learning drive pattern DW1 in the case in which the discharge lamp 90 has deteriorated. Therefore, it is easy to appropriately evaluate the machine learning drive pattern DW1, and as a result, the life of the discharge lamp 90 can be extended.

Further, it is also possible for the control section 40 to change the number of the machine learning drive patterns DW1, or change the types of the drive parameters in each of the drive operations of the machine learning drive patterns DW1 based on the lamp voltage V1a in the machine learning control MLC. In these cases, it is also possible for the control section 40 to change the number of the types of the drive parameters different between the machine learning drive patterns DW1 based on the lamp voltage V1a. For example, it is also possible for the control section 40 to increase the number of the types of the drive parameters different between the machine learning drive patterns DW1 in the case in which the lamp voltage V1a is higher than a first voltage. According to this configuration, in the case in which the discharge lamp 90 has deteriorated, it is easy to increase the stimulus due to the change in the thermal load applied to the first electrode 92, and it is possible to further extend the life of the discharge lamp 90.

Further, it is also possible for the control section 40 to select the machine learning drive pattern DW1 based on the change in the lamp voltage V1a occurring until just before the selection in the machine learning control MLC. Further, it is also possible for the control section 40 to arrange that each of all of the machine learning drive patterns DW1 is executed one or more times without fail in each cycle in the steady learning period. Further, it is also possible for the control section 40 to create the machine learning drive pattern DW1 other than the plurality of machine learning drive patterns DW1 set in advance in the steady learning period. In this case, it is also possible for the control section 40 to combine the drive parameters to create the new machine learning drive pattern DW1 based on the ratings of the respective machine learning drive patterns DW1 set in advance.

Further, in the step S15 in the initial learning period, it is also possible for the control section 40 to determine whether or not the machine learning drive pattern DW1 presently selected fulfills the switching condition as in the step S28 in the steady learning period. For example, in the case in which the machine learning drive pattern DW1 presently selected fulfills the switching condition, it is also possible for the control section 40 to lower the rating of the machine learning drive pattern DW1 presently selected to perform the switching from the machine learning drive pattern DW1 presently selected to another of the machine learning drive patterns DW1. In contrast, in the case in which the machine learning drive pattern DW1 presently selected does not fulfill the switching condition, it is also possible for the control section 40 to execute the machine learning drive pattern DW1 presently selected until the initial learning time elapses. It should be noted that the switching condition on this occasion can be the same as the switching condition in the step S28, or can also be different therefrom.

Further, the predetermined drive pattern DW executed in the case in which the predetermined condition is fulfilled is not particularly limited providing the drive pattern DW is not the selection and the execution of the machine learning drive pattern DW1 based on the machine learning. Therefore, it is also possible to perform other non-machine learning control NMLC than the examples of the non-machine learning control NMLC described above. For example, it is also possible for the control section 40 to execute a predetermined drive pattern DW in the case in which the lamp voltage V1a is higher than a third predetermined voltage value. In this case, the third predetermined voltage value is, for example, the highest value of the target numerical value range.

Further, if at least one of the non-machine learning control NMLC operations is performed, any one or more of the examples of the non-machine learning control NMLC are not required to be performed. Further, it is also possible for another drive pattern DW to which the input section 45 forcibly switches to be switched continuously a plurality of times in response to a single input to the input section 45. Further, another drive pattern DW to which the input section 45 switches in the case in which the input section 45 has received the switching input of the drive pattern DW is not particularly limited providing the drive pattern DW is different from the drive pattern DW presently executed. The switching to another drive pattern DW in the case in which the input section 45 has received the switching input of the drive pattern DW can also be performed while performing any of the control operations described above.

Further, it is possible for the predetermined condition for the non-machine learning control NMLC to be performed to include the fact that the short-term lighting SL has been performed in a proportion equal to or higher than a predetermined proportion. It is also possible for the control section 40 to execute the high-load drive pattern DWH for the second predetermined time in the case in which the short-term lighting SL has been performed in a proportion equal to or higher than the predetermined proportion. The expression that the short-term lighting SL is performed in a proportion equal to or higher than the predetermined proportion includes the fact that, for example, the proportion of the short-term lighting SL to a given number of times of lighting operation is equal to or higher than the predetermined proportion in the case in which the lighting operation of the discharge lamp 90 has been performed the given number of times. The expression that the short-term lighting SL is performed in a proportion equal to or higher than the predetermined proportion corresponds to the case in which the lighting operation of the discharge lamp 90 has been performed 20 times, and the short-term lighting SL has been performed 15 times or more out of 20 times, as an example. In this case, the number of times the short-term lighting SL has been performed continuously can be smaller than the predetermined number of times.

For example, even in the case in which the number of times of the short-term lighting SL performed in a row is smaller than the predetermined number of times, in the case in which the short-term lighting SL is performed frequently, the projections 552p, 562p easily deform and the flickers easily occur. In contrast, according to this configuration, even in the case in which the number of times of the short-term lighting SL performed in a row is smaller than the predetermined number of times, the high-load drive pattern DWH can be executed, and therefore, the flickers can further be suppressed.

Further, in the present embodiment, the input section 45 is connected to the control section 40 of the discharge lamp lighting device 10, but this is not a limitation. It is also possible to adopt a configuration in which the input section 45 is connected to the CPU 580 of the projector 500 to output a signal corresponding to the input to the CPU 580. In this case, the CPU 580 controls the discharge lamp lighting device 10 in accordance with the signal from the input section 45.

Further, although in the embodiment described above, an example of the case in which the invention is applied to the transmissive projector is explained, the invention can also be applied to reflective projectors. Here, "transmissive" denotes that the liquid crystal light valve including the liquid crystal panel and so on is a type of transmitting the light. Further, "reflective" denotes that the liquid crystal light valve is a type of reflecting the light. It should be noted that the light modulation device is not limited to the liquid crystal panel or the like, but can also be a light modulation device using, for example, micro-mirrors.

Further, although in the embodiment described above, there is cited the example of the projector 500 using the three liquid crystal panels 560R, 560G, and 560B (the liquid crystal light valves 330R, 330G, and 330B), the invention can be applied to a projector using a single liquid crystal panel alone, or a projector using four or more liquid crystal panels.

Further, the configurations described hereinabove can arbitrarily be combined with each other within a range in which the configurations do not conflict with each other.

Specific Example

A specific example and a comparative example were compared with each other to confirm the availability of the invention. Firstly, in both of the specific example and the comparative example, the plurality of machine learning drive patterns DW1 was made to arbitrarily be selected and executed for 2000 h (hours) using the machine learning of the embodiment described above. In other words, the wear of the discharge lamp was progressed to some extent. Subsequently, in both of the specific example and the comparative example, an operation of lighting the discharge lamp for 3 min (minutes) and then turning the discharge lamp off for 3 min (minutes) was repeated 100 times. On this occasion, in the specific example, the high-load drive pattern DWH was executed during the lighting period on and after the 7th operation without performing the selection and the execution of the machine learning drive pattern DW1 due to the machine learning. In the comparative example, the selection and the execution of the machine learning drive pattern DW1 due to the machine learning were performed during the lighting period also on and after the 7th operation.

The machine learning drive patterns DW1 were assumed to be based of the drive patterns DW having the drive current waveform shown in FIG. 9. Further, the drive parameters of the AC drive operation and the DC drive operation in the plurality of drive patterns DW are assumed to be the three types, namely the first frequency f1 and the second frequency f2, the lengths ta1, ta2 of the execution time of the AC drive operation, and the lengths td1, td2 of the execution time of the DC drive operation. Further, it was assumed that as the numerical values of each of the types of the drive parameters, the first frequency f1 and the second frequency f2 were selected from 200 Hz, 300 Hz, and 400 Hz, the lengths ta1, ta2 of the execution time of the AC drive operations were selected from 0.1 ms (millisecond), 0.2 ms (millisecond) and 0.5 ms (millisecond), and the lengths td1, td2 of the execution time of the DC drive operations were selected from 10 ms (millisecond), 20 ms (millisecond), and 30 ms (millisecond). Further, as the number of the drive patterns DW, totally 27 patterns were prepared by combining the three types of drive parameters described above and the numerical values thereof with each other.

The drive pattern DW alternately repeating the machine learning drive pattern DW1 shown in FIG. 9 and the machine learning drive pattern DW1 using the imbalanced drive BD was used as the high-load drive pattern DWH used in the specific example. Therefore, in the high-load drive pattern DWH, there were provided the first period, the second period, and the third period. The basic frequency of the first frequency f1 in the first period was set to 200 Hz, the length of the first period was set to 200 ms (milliseconds), the length of the second period was set to 10 ms (milliseconds), and the length of the third period was set to 100 ms (milliseconds).

As the discharge lamp 90, a high-pressure mercury lamp rated at 200 W was used. The drive power Wd supplied to the discharge lamp was set to 200 W. In both of the specific example and the comparative example, the number of times the flicker was visually recognized in the 100 times of lighting operations described above was counted. As a result, the flicker was visually recognized in the 21 times of lighting operations in the comparative example on the one hand, the flicker was never visually recognized in the specific example on the other hand. Therefore, it was confirmed that the flicker could be suppressed by combining the selection and the execution of the machine learning drive pattern DW1 due to the machine learning, and the process of executing the predetermined drive pattern DW without selecting and executing the machine learning drive pattern DW1 due to the machine learning with each other. According to the above, the availability of the invention was confirmed.

The entire disclosure of Japanese Patent Application No. 2017-190276, filed Sep. 29, 2017 is expressly incorporated by reference herein.

What is claimed is:

1. A discharge lamp drive device comprising:
   a discharge lamp driver adapted to supply a drive current to a discharge lamp having a first electrode and a second electrode;
   a control section adapted to control the discharge lamp driver; and
   a storage section adapted to store a plurality of drive patterns of the drive current, wherein the control section is configured to select one drive pattern of the plurality of drive patterns based on machine learning, and execute the selected drive pattern, and wherein in a case in which a predetermined condition is fulfilled, the control section executes a predetermined drive pattern of the plurality of drive patterns without selecting and executing the drive pattern based on the machine learning.

2. The discharge lamp drive device according to claim 1, further comprising:

a voltage detection section adapted to detect an inter-electrode voltage of the discharge lamp, wherein in a case in which the predetermined condition is not fulfilled, the control section controls the discharge lamp driver so that a mixed period is provided, the mixed period in which a first period in which AC current is supplied to the discharge lamp and a second period in which DC current is supplied to the discharge lamp are alternately repeated, wherein the predetermined condition includes that the inter-electrode voltage is lower than a first predetermined voltage value, wherein in a case in which the inter-electrode voltage is lower than the first predetermined voltage value, the control section executes a drive pattern including a low-frequency period as the predetermined drive pattern, and wherein in the low-frequency period, the AC current having a frequency lower than a frequency of the AC current supplied in the first period is supplied to the discharge lamp.

3. The discharge lamp drive device according to claim 2, wherein the predetermined condition includes a condition that the inter-electrode voltage is lower than the first predetermined voltage value and a drive power supplied to the discharge lamp is higher than a predetermined power value, wherein in a case in which the inter-electrode voltage is lower than the first predetermined voltage value and in a case in which the drive power is higher than the predetermined electrical power value, the control section executes a drive pattern including the low-frequency period and a third period as the predetermined drive pattern, wherein the third period alternately including
  a first DC period in which DC current is supplied to the discharge lamp and
  a second DC period in which DC current having an opposite polarity to a polarity of the DC current supplied in the first DC period is supplied to the discharge lamp, wherein a length of the second DC period is shorter than 0.5 ms, and wherein a sum of the lengths of the first DC periods in the third period is larger than a length of the second period.

4. The discharge lamp drive device according to claim 2, wherein the low-frequency period has a first AC period and a second AC period, and wherein a frequency of AC current supplied in the first AC period and a frequency of AC current supplied in the second AC period are different from each other.

5. The discharge lamp drive device according to claim 1, wherein the predetermined condition includes a condition that a proportion of a change of a drive power supplied to the discharge lamp is a proportion no lower than a predetermined proportion.

6. The discharge lamp drive device according to claim 5, wherein in a case in which the predetermined condition is not fulfilled, the control section controls the discharge lamp driver to execute a first drive pattern so that a mixed period is provided, the mixed period in which a first period in which AC current having a frequency is supplied to the discharge lamp and a second period in which DC current is supplied to the discharge lamp are alternately repeated, wherein in a case in which the proportion of the change of the drive power is no lower than the predetermined proportion, the control section executes a second drive pattern different from the first drive pattern as the predetermined drive pattern, wherein the second drive pattern includes the mixed period, wherein a length of the first period in the second drive pattern is larger than a length of the first period in the first drive pattern, and wherein a frequency of the AC current in the first period in the second drive pattern is higher than a frequency of the AC current in the first period in the first drive pattern.

7. The discharge lamp drive device according to claim 6, wherein a length of the second period in the second drive pattern is smaller than a length of the second period in the first drive pattern.

8. The discharge lamp drive device according to claim 6, wherein the first drive pattern and the second drive pattern each include a third period alternately including
  a first DC period in which DC current is supplied to the discharge lamp, and
  a second DC period in which DC current having an opposite polarity to a polarity of the DC current supplied in the first DC period is supplied to the discharge lamp, wherein a length of the first DC period is larger than a length of the second DC period, wherein the length of the second DC period is shorter than 0.5 ms, wherein a sum of the lengths of the first DC periods in the third period is larger than a length of the second period, and wherein a length of the third period in the second drive pattern is smaller than a length of the third period in the first drive pattern.

9. The discharge lamp drive device according to claim 6, further comprising:

a voltage detection section adapted to detect an inter-electrode voltage of the discharge lamp, wherein the control section switches from the second drive pattern to the drive pattern based on the machine learning, based on one of a length of an execution time of the second drive pattern and the inter-electrode voltage.

10. The discharge lamp drive device according to claim 9, wherein in a case in which the inter-electrode voltage decreases by a predetermined value or more after starting an execution of the second drive pattern, the control section switches from the second drive pattern to the drive pattern based on the machine learning.

11. The discharge lamp drive device according to claim 6, wherein the predetermined condition includes a condition that an input section adapted to receive an execution input of the second drive pattern has received the execution input of the second drive pattern, and wherein in a case in which the input section has received the execution input of the second drive pattern, the control section switches from the drive pattern presently executed to the second drive pattern.

12. The discharge lamp drive device according to claim 1, wherein the predetermined condition includes a condition that an input section adapted to receive a switching input of the drive pattern has received the switching input of the drive pattern, and
wherein in a case in which the input section has received the switching input of the drive pattern, the control section switches from the drive pattern presently executed to another drive pattern.

13. The discharge lamp drive device according to claim 11,
wherein the control section is configured to prevent the execution of the drive pattern having been executed immediately before switching of the drive pattern for a given time from the switching of the drive pattern based on the input received by the input section.

14. The discharge lamp drive device according to claim 1,
wherein the predetermined condition includes a condition that
short-term lighting in which a lighting time of one lighting operation of the discharge lamp is no more than a first predetermined time is executed continuously a predetermined number of times, and
the short-term lighting is performed in a proportion no smaller than a predetermined proportion to a total lighting time of the discharge lamp,
wherein in a case in which the predetermined condition is not fulfilled, the control section executes the first drive pattern, and
wherein in a case in which the short-term lighting has been performed continuously the predetermined number of times, or a case in which the short-term lighting has been performed in the proportion no smaller than the predetermined proportion, the control section executes a drive pattern for a second predetermined time, the drive pattern having a higher thermal load applied to the first electrode and the second electrode than that in the first drive pattern.

15. A projector comprising
a discharge lamp adapted to emit light;
the discharge lamp drive device according to claim 1;
a light modulation device adapted to modulate light emitted from the discharge lamp in accordance with an image signal; and
a projection optical system adapted to project the light modulated by the light modulation device.

16. A projector comprising
a discharge lamp adapted to emit light;
the discharge lamp drive device according to claim 2;
a light modulation device adapted to modulate light emitted from the discharge lamp in accordance with an image signal; and
a projection optical system adapted to project the light modulated by the light modulation device.

17. A projector comprising
a discharge lamp adapted to emit light;
the discharge lamp drive device according to claim 5;
a light modulation device adapted to modulate light emitted from the discharge lamp in accordance with an image signal; and
a projection optical system adapted to project the light modulated by the light modulation device.

18. A projector comprising
a discharge lamp adapted to emit light;
the discharge lamp drive device according to claim 12;
a light modulation device adapted to modulate light emitted from the discharge lamp in accordance with an image signal; and
a projection optical system adapted to project the light modulated by the light modulation device.

19. A projector comprising:
a discharge lamp adapted to emit light;
the discharge lamp drive device according to claim 14;
a light modulation device adapted to modulate light emitted from the light source device in accordance with an image signal; and
a projection optical system adapted to project the light modulated by the light modulation device.

20. A discharge lamp drive method adapted to supply a drive current to a discharge lamp having a first electrode and a second electrode to drive the discharge lamp, the method comprising:
selecting one drive pattern of a plurality of drive patterns of the drive current based on machine learning;
executing the selected drive pattern; and
executing, in a case in which a predetermined condition is fulfilled, a predetermined drive pattern of the plurality of drive patterns without selecting and executing the drive pattern based on the machine learning.

* * * * *